(12) United States Patent
Greiter

(10) Patent No.: US 6,824,484 B2
(45) Date of Patent: Nov. 30, 2004

(54) CHAIN

(75) Inventor: Ivo Greiter, Grossmehrung (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/388,577

(22) Filed: Mar. 17, 2003

(65) Prior Publication Data

US 2003/0186767 A1 Oct. 2, 2003

Related U.S. Application Data

(62) Division of application No. 09/689,484, filed on Oct. 12, 2000, now Pat. No. 6,558,281.

(30) Foreign Application Priority Data

Oct. 13, 1999 (DE) .......................................... 199 49 207
Nov. 19, 1999 (DE) .......................................... 199 55 956

(51) Int. Cl.[7] ................................................ F16G 5/18
(52) U.S. Cl. .................... 474/201; 59/6; 59/8; 59/29
(58) Field of Search ................................ 474/201, 214, 474/215, 216, 219, 221, 223, 224, 225; 59/5, 6, 8, 29

(56) References Cited

U.S. PATENT DOCUMENTS

| | | | | |
|---|---|---|---|---|
| 3,359,815 A | * | 12/1967 | Jeffery et al. | ................ 474/231 |
| 3,869,856 A | * | 3/1975 | Wildman et al. | ................. 59/8 |
| 4,718,881 A | * | 1/1988 | Sugimoto et al. | ........... 474/242 |
| 4,911,682 A | * | 3/1990 | Ivey et al. | ................... 474/245 |
| 5,464,374 A | * | 11/1995 | Mott | .......................... 474/224 |
| 6,142,903 A | * | 11/2000 | Heinrich | ..................... 474/215 |

* cited by examiner

*Primary Examiner*—David A. Bucci
*Assistant Examiner*—Vicky A. Johnson
(74) *Attorney, Agent, or Firm*—Alfred J. Mangels

(57) ABSTRACT

A drive chain suitable for use in a continuously variable transmission of a motor vehicle, the transmission having two pairs of spaced drive members about which the chain passes to transfer torque from one drive member to the other. The chain includes a plurality of link elements that include spaced, side-by-side plate links. The plate links include openings in which pairs of parallel rocker members are disposed for relative rocking movement of at least one rocker member about its longitudinal axis. The rocker members extend outwardly beyond the plate links and are retained in position by retaining members that engage particular rocker members. A method for stretching the chain is also disclosed in which areas of some of the plate links are plastically deformed before the chain is put to use.

9 Claims, 17 Drawing Sheets

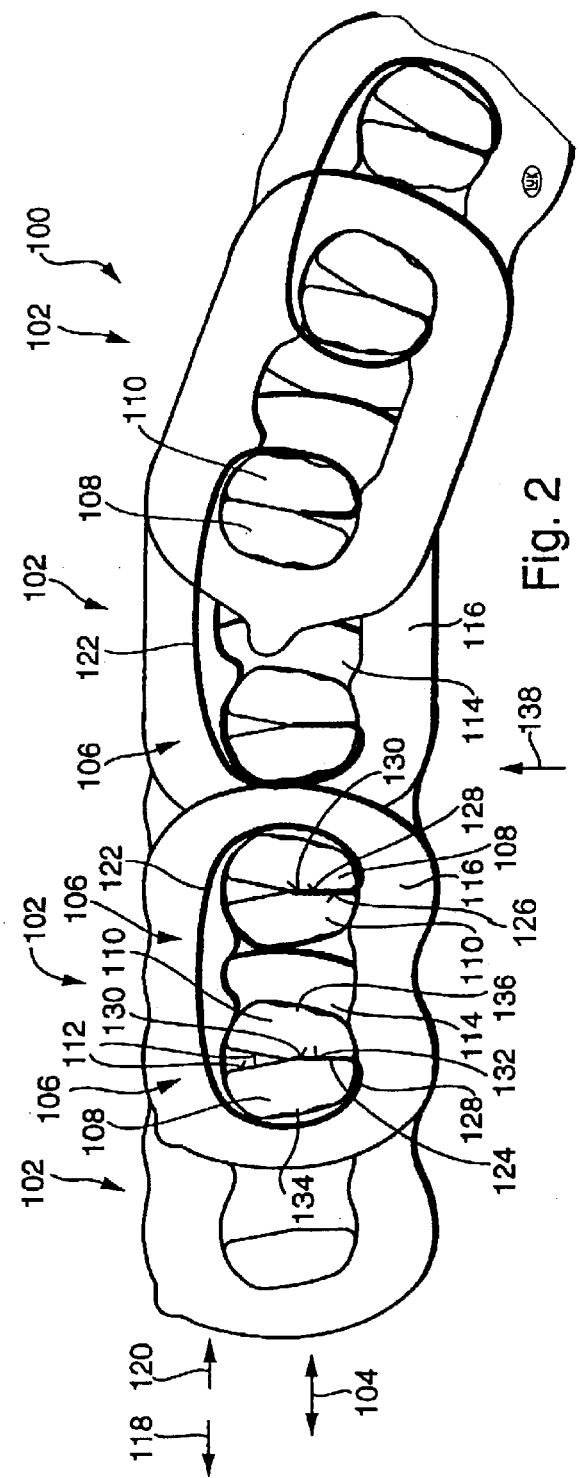
Fig. 2
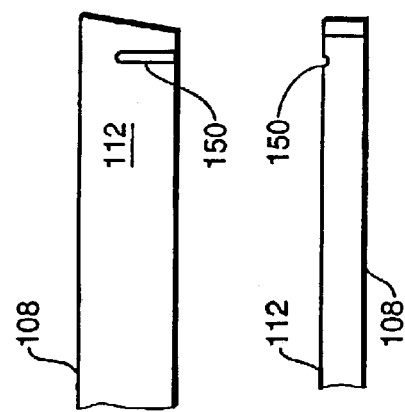
Fig. 3
Fig. 4

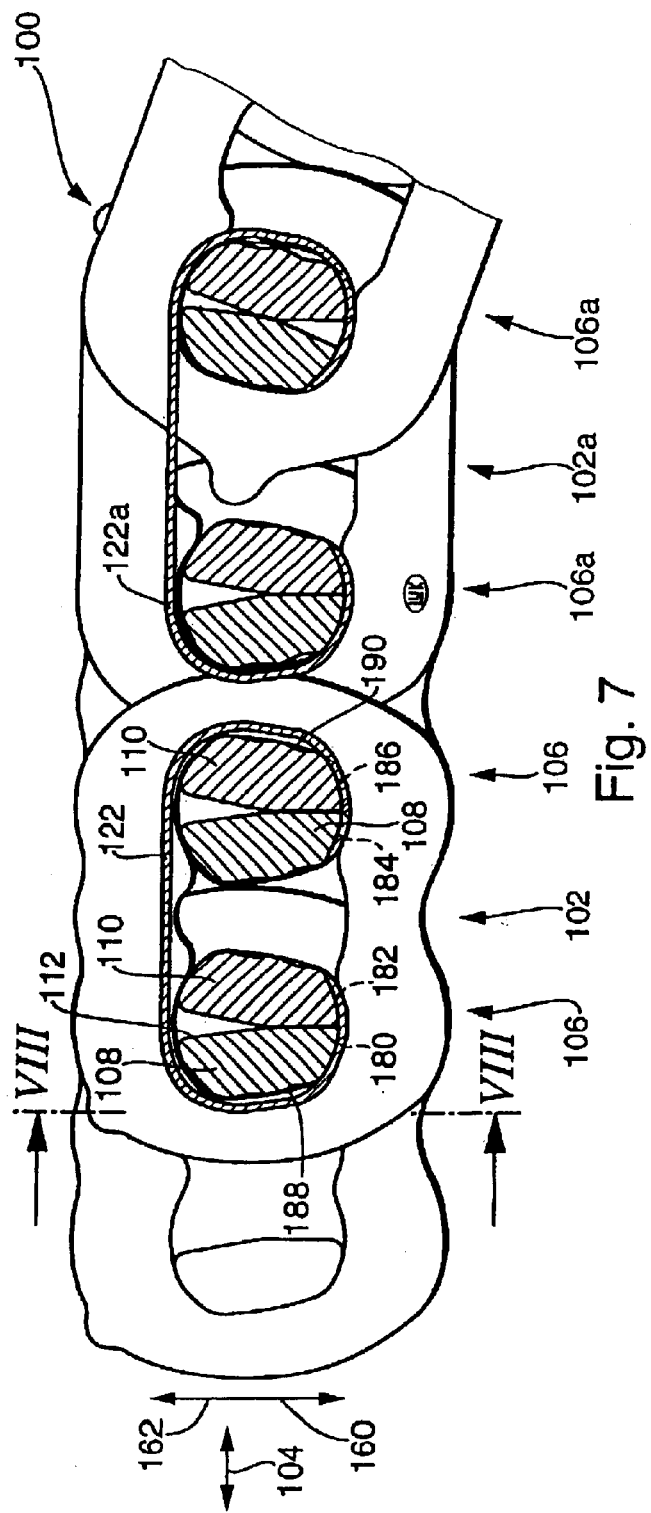
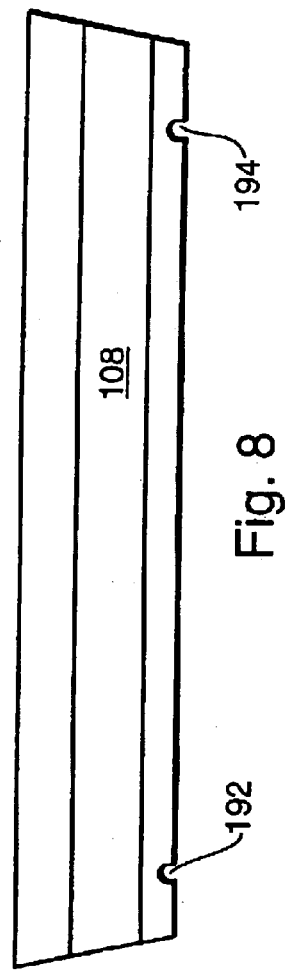
Fig. 7
Fig. 8

CHAIN

CROSS-REFERENCE TO RELATED APPLICATION

This application is a divisional of application Ser. No. 09/689,484, filed Oct. 12, 2000 now U.S. Pat. No. 6,558,281, the entire disclosure of which is hereby incorporated by reference.

BACKGROUND OF THE INVENTION

1. Field of the Invention

The invention relates to a plate-link chain for a continuously variable transmission of a motor vehicle.

2. Description of the Related Art

A plate-link chain is in the sense of the present invention a wrap-around member that has several chain links that in each case extend in the wrap-around, that is, in a running, direction, of which each of two adjacent link elements are linked together in an articulated manner.

The chain links in each case have several elements, which in the sense of the present invention are shown as plates, and that are particularly formed small-plate-like, so that their thickness is comparatively small in comparison with their length and in comparison with their width. The links, that are especially in the form of stampings, include through-openings.

In the sense of the present invention a link element is in particular a device with two rocker members that are arranged to be movable against each other. Those two similar link elements have adjoining rocker members that have in each case a surface, a so-called rocker surface, that is associated in each case with a corresponding rocker member of the link element and that can roll on the rocker surface of the associated rocker member. In particular, the rocker members are associated with different adjacent chain links. Especially, each of the rocker members is non-rotatably connected with its associated chain link, namely in relation to the longitudinal axis of the link element. This non-rotational connection in particular is positively formed. The plate-link chain is particularly constructed in the manner so that at least one rocker member of a link element is movable in the longitudinal direction of the rocker member relative to the plate-link chain, and/or at least one part of the plate link, through which the rocker member extends, is movable relative to the rocker member in the direction of the longitudinal axis of the rocker member.

In particular a plate-link chain in the sense of the present invention is constructed in such a way that for each link element at least one rocker member projects laterally from the plate-link chain. The rocker members associated with a link element can have the same or a different construction. Those equal rocker members associated with the link element have, in particular, a different length. Preferably at least one rocker member of a link element has a sloping and/or a rounded end face.

A continuously variable transmission is in the sense of the present invention in particular a transmission apparatus that, in a predetermined transmission ratio range, can be operated steplessly at different, that is, all, transmission ratios between an input and an output shaft. This transmission has in particular two pairs of conical disks, of which one pair is connected to the input shaft and one pair is connected with the output shaft. The conical disks of the pairs of conical disks are in each case arranged to be axially movable relative to each other and can receive a plate-link chain in the gap area between them, whereby in the sense of the present invention it is especially provided that one of such plate-link chains is positively connected with the respective conical-disk pairs over different end faces of several rocker members of a link element of the plate-link chain, so that a torque can be transmitted between those conical disks by way of the plate link chain.

The continuously variable transmission has in particular an actuation apparatus, which preferably is of hydraulic form, and can control changes in the spacing of the respective conical disk pairs, and, to be sure, especially simultaneously, so that with the enlargement of the distance between the conical disks of a first conical disk pair a reduction of the distance between the conical disks of the second conical disk pair proceeds, and the plate-link can also transmit a torque between the conical disk pairs during an adjustment of the transmission ratio of the transmission.

A plate-link chain with a retaining element is already known from the German DE 198 55 582. That known plate-link chain has several chain links with plate links that are connected over link elements with rocker member pairs, whereby the rocker members are non-rotationally secured in the plate links and whereby one of the retaining links provided as outer links permits a change in spacing of the rocker members and prevents an outward migration.

The object of the present invention is to create a plate-link chain, by which by structurally simple and economical methods with higher strength of the link elements, that prevents the plate links and/or the rocker members from laterally migrating out of the plate-link chain, and which provides higher strength.

The object is solved through a plate-link chain as hereinafter described.

Preferred improvements of the invention are also disclosed hereinafter.

SUMMARY OF THE INVENTION

In accordance with the invention a plate-link chain is proposed that has at least one rocker member, in which a recess extends, that particularly is ground in the respective rocker member. In that recess of the rocker member at least one retaining element is engaged, and to be sure in such a way, that through the retaining element, if necessary in cooperation with other elements, particularly further retaining elements, the movability of the rocker element against at least one plate link of the plate-link chain in the direction of the longitudinal axis of the rocker member and the link element, respectively, that this rocker member has, at least restricts, especially prevents. Preferably this retaining element has a bow-shaped form.

The invention is advantageous to the extent that it secures the rocker members in a dependable way and method, the retaining elements can be releasably attached against the rocker members, and because of the retaining elements the rocker members undergo substantially no appreciable loss of strength. Particularly in a straight segment of the plate-link chain, the rocker members are positively secured against falling out.

Preferably the retaining element has a bow-shaped form.

In accordance with the invention, a plate-link chain is proposed that has at least one retaining element which at least limits and particularly prevents the movement of a rocker member relative to at least one plate link in the direction of the longitudinal axis of the rocker member, that is, the longitudinal axis of the link element. In that case a rocker member has at least one recess. The at least one retaining element has at least one free end, and especially two free ends, so that at least one rocker member is connected with the retaining element in a form-locking and/or friction-locking manner, without the rocker member being received in a peripheral direction in a closed opening of the retaining element. It is preferred that at least one rocker member is received in a peripherally closed opening of the retaining element and is connected with the retaining element in a frictionally-locked and/or a form-locked manner, whereby the retaining element further has a free end that is form and /or frictionally connected with at least one additional rocker member.

The retaining element limits and/or prevents rocker member movement relative to at least one plate link in the longitudinal direction of the rocker member as well as the link element.

The retaining element preferably has two open ends. Especially preferred is that the retaining elements is releasably engaged in the recess. The retaining element, which preferably is elastic in the direction of chain movement, preferably grips at least two recesses of different rocker members.

Especially preferred, the retaining element presses against a recess when in assembled condition. That is particularly realized in that the retaining element itself applies a clamping force, whereby the retaining element in particular is biased and the clamping force is generated by the resulting biasing force.

In accordance with a preferred embodiment of the invention, a retaining element extends into a recess, and, to be sure, without loading the bottom area of the recess with a clamping force.

Preferably at least one groove-shaped or hole-shaped recess is formed and has a constant or a varying depth.

Preferably the recess extends at least partially straight and/or at least partially curved.

Especially preferred, a recess extends substantially parallel with the longitudinal axis of a link element, or at an angle different from 0° to that longitudinal axis. Preferably at least one recess extends at least partially around a link element, that is, around a central longitudinal axis of a rocker member. Especially preferred, the groove thereby runs on a circle or along an arc of circle or along a helical path.

Especially preferred, a recess extends along a longitudinal axis of the link element and a rocker member, respectively, and thereby encompasses in a peripheral direction an angle of at least 45°, especially preferred at least 90°, especially preferred at least 180°, especially preferred at least 270°, which preferably is less than 360°.

Preferably at least one rocker member has a recess in one or in both of its end areas.

Preferably at least one rocker member is formed without a recess.

Preferably at least one recess extends along the peripheral surface and/or on at least one front face of a rocker member.

Especially preferred, at least one retaining element contacts a rocker member frictionally or force lockingly.

In accordance with an especially preferred embodiment of the invention, at least one retaining element extends substantially parallel to an adjacent plate link of the plate link arrangement and/or substantially in the direction of movement of the plate-link chain.

Preferably retaining elements are provided in each case in the end areas of the rocker members or the link elements, so that between the retaining elements of the chain link in question a chain link extends that is associated with a plate link arrangement.

In accordance with an especially preferred embodiment of the invention, there is in at least one link element a chain link of this link element, that is, at least one rocker member of that link element that is in an area that lies outside of the link arrangement through a retaining element that is form-lockingly secured, and a second outer area lying on the other side of the chain, through a retaining element that is secured force- or frictionally locked.

The frictionally locked retaining element engages particularly at least two rocker members or at least two link elements.

Especially preferred, a retaining element engages in each case in at least one recess and runs from at least two rocker members or at least two link elements.

Preferably, one retaining element engages each recess of four rocker members.

In accordance with an especially preferred embodiment of the invention, at least one rocker member is force-lockingly secured and at least one rocker member is form-lockingly secured by means of one retaining element.

In accordance with a preferred embodiment of the present invention, at least one retaining element contacts at least one rocker member and/or at least one link element on two different sides, so that the rocker member or the link element is clamped by the retaining element. Particularly, the retaining element contacts the rocker member or the link element on two substantially oppositely-lying surface areas on the outer periphery. Especially preferred, the retaining element contacts different rocker members on their peripheral areas and thereby clamps the rocker members. In accordance with an especially preferred embodiment of the invention, one retaining element contacts at least one rocker member in each case on oppositely-lying front faces.

In accordance with an especially preferred embodiment of the invention, at least one retaining element has two free ends, whereby the retaining element in the area of its free ends clamps at least one rocker member or at least one link element.

Preferably, the clamped rocker members and/or the clamped pairs of rocker members are clamped by means of oppositely-directed loads by the retaining elements, whereby the load is particularly a pressure load or a tension load.

The retaining element prevents or restricts in particular any movement between at least one plate link and at least one link element or at least one rocker member, and to be sure in either or in both directions.

In accordance with a preferred embodiment of the invention, at least one recess extends in one rocker surface of at least one rocker member.

In accordance with an especially preferred embodiment of the invention, the rocker members of a pair of rocker members each have at least one recess, in which the same retaining element is engaged, whereby the recesses extend particularly on the outer peripheral surfaces of the rocker members or on the rocker surfaces.

Preferably at least one retaining element extends from a first link element to an adjacent link element and in each case engages a recess.

Especially preferred, the four rocker members of two adjacent link elements each have at least one recess in which the same retaining element engages.

In accordance with a preferred embodiment of the invention at least one retaining element engages a recess that is arranged on a front face of a rocker member.

Preferably at least one rocker member has a recess on its outer surface or peripheral surface, which especially preferably extends on the rocker member surface that faces away and in which a retaining element is gripped.

In accordance with an especially preferred embodiment of the invention the plate-link chain has at least two differently-constructed or formed retaining elements.

In accordance with an especially preferred embodiment of the invention, a retaining member has at least two free ends, whereby the retaining element grips the rocker members in such a way that the free ends are directed to the outside or to the inside of the chain.

The inner side of the chain in particular is the side that faces the axes of the conical disks.

In accordance with an especially preferred embodiment of the invention different retaining elements are provided in one plate-link chain, which are formed identically or differently, and which relative to the respective link elements that are engaged by the retaining elements, are arranged differently. Particularly, one retaining element engages in such a way that the free ends are directed to the outside, while a second retaining element engages in such a way that the free ends are directed to the inside of the plate-link chain.

In accordance with an especially preferred embodiment of the invention, at least one retaining element of the plate-link chain has two free ends, of which at least one is formed as a bend.

In accordance with an especially preferred embodiment of the invention two relatively immovable and/or non-rotatable rocker members are connected by means of some retaining elements, and particularly by means of some wire bows. The retaining element or retaining link or the wire bow is particularly arranged in accordance with the invention so that the retaining element or wire bow is during operation exposed to no or only very small dynamic stresses.

Further preferred, the retaining element, which is particularly formed as a wire bow, shows only a small bending stress at wear risk areas.

In accordance with the invention it is proposed to form a plate-link chain in such a way that at within at least one chain link at least two plate links are arranged, which are at an included angle with each other so that they are not arranged in parallel.

Preferably, to each of the plate links within the same chain link that are at an included angle with each other there is arranged at least one additional parallel plate link.

Preferably, the plate links within one chain link are arranged in the form of a V, whereby the V-form is open or closed in the direction of movement of the plate-link chain.

It should be pointed out that the cooperation between individual features of the invention is preferred in any arbitrary combination. In particular, combinations of features disclosed by the independent claims also always are preferred when omitting one or more features.

It should further be noted that the discussions relating to all known apparatus not related to specific documents are known foremost to the applicant or to the inventor, and therefore the inventor reserves protection for those that are not known to the public.

It should be noted that when features are linked by "or," the "or" always means on one hand a mathematical "or" and on the other hand always the "or" that excludes the other possibility.

It should further be noted that the concept of control as well as its derived concepts are to be construed widely in the sense of the invention. In particular it includes regulation and/or control in the sense defined in DIN.

It is clear to the expert that a plurality of further modifications and embodiments of the invention are conceivable beyond the exemplary embodiments disclosed herein and are covered by the invention. In particular the invention is not restricted to the embodiments discussed herein.

The invention further concerns a plate-link chain in particular for a steplessly variable gear ratio, conical-disk transmissions, such as CVT transmissions, of which the individual chain links are formed from sets of plate links connected by articulation members, preferably as pairs of rocker members having rocker faces braced against each other and that are inserted into recesses in the plate links. The invention also concerns a method for manufacturing such a chain.

Such plate-link chains are known in the state of the art. Examples are DE 197 08 865 and the documents cited therein, EP 0 518 478 and EP 0 741 255.

In plate-link chains of those kinds, to increase the load carrying capacity after assembly of the plate links and rocker members in a straight strand and an open formation, a stretching process is carried out by applying substantial tension forces to the extended plate-link chain. In that way the contact areas of the plate links between the plate links and the rocker members of all plate links of a row are equally plastically deformed. By stretching in a straight strand there arises an equalized plastic deformation of the plate links in the contact areas, so that the plate links of one row of plate links are equally elongated over the width of the plate link or exhibit equal lengths. That has the disadvantage that when the plate-link chain is under load during operation of a stepless, variable transmission the chains do not exhibit optimal service life and performance capacity.

An object of the invention is to create a plate-link chain and a method for its manufacture which, relative to the plate-link chains of the state of the art particularly, withstand higher operating loads or, at equal loads, have a longer service life.

In accordance with the invention the object is achieved for the above-designated plate-link chains in that the plate-link chain is stretched when in a closed condition.

The object of the invention is also solved in that for a plate-link chain of the type described above the plate links have a different plate link inner width as a function of the chain width. That can be achieved in accordance with the invention by stretching the plate-link chain in the closed condition as a wrap-around member.

The concept of plate link inner width corresponds with the distance between the contours on which both outer rocker members lie against the plate link. That is thus a distance that is not dependent upon whether the plate link has a central opening or two openings to receive the rocker members. Furthermore, it is presented in the figure descriptions.

It is advantageous from another embodiment, however, to manufacture the plate links by different manufacturing processes, such as a stamping process or a cutting process, for example by means of a laser, or the like, and the individual plates are stretched equally or differently and are assembled together, or the assembled chain is stretched in the wrap-around condition.

It is also appropriate by a further embodiment to produce the plate links by a stamping process with equal plate link inner widths, and that are differently stretched and assembled together. The stretching can in this embodiment also be carried out on the individual plate links before assembly or in the wrap-around condition on an assembled chain.

According to a further inventive concept, the object of the invention can also be achieved by an above-designated plate-link chain in which the plate links exhibit a different degree of stretch as a function of the chain width.

That result can thereby be advantageously achieved by stretching to a different degree of stretch the plate links having the same or different plate link inner widths and assembling them together. That can also be achieved by stretching in the wrap-around condition.

According to a further inventive concept, the object of the invention can also be solved for an above-designated plate-link chain in which the plate links, as a function of the chain width, exhibit a different angle considered between the contact areas and an axis that is oblique to the chain longitudinal direction. Thereby a modulation or variation of the angle over the chain width is achieved, which permits a relatively good fit or installation of the plate links on which in operation of the chain the rocker members are partly bent.

According to a further inventive concept the object of the invention for an above-designated plate-link chain can also be solved in that the stretching load that impacts on the plate links by a stretching process has a variable angle in relation to the plate-link length direction. Thereby the plate links are stretched at different places in their contact areas and therewith strengthened in that manner, so that they exhibit sufficient strength when loaded during the operation of the chain, both in a straight strand between the conical disk pairs and in the area of the conical disk pairs.

It is particularly advantageous when the plates are individually stretched and subsequently assembled to each other. By another embodiment it is appropriate for the plate links to be stretched when in assembled condition of the closed chain, such as particularly in the wrap-around mode when arranged between two sets of conical disks of an apparatus.

The invention advantageously applies to plate-link chains in which at least one of the respective end faces of the rocker members per link associated with a conical disk carries the frictional forces between the conical disks and the plate-link chain. It can therefore be appropriate according to each application instance of the exemplary embodiments for the rocker elements to have the same length or different lengths.

The invention advantageously also applies to plate-link chains in which the plate-link chain has, in addition to rocker members, connecting pins that carry the frictional forces between conical disks and the plate-link chain.

It is particularly advantageous when the plate links adjacent to the edge of the plate-link chain are more highly elongated than those plate links arranged in the middle of the plate-link chain, or when the plate links adjacent to the edge of the plate-link chain have a larger plate link inner width than those plate links arranged in the middle of the plate-link chain.

Furthermore, it is appropriate when as a result of a stretching process contact areas of the plate links with the rocker members are in that manner plastically deformed, that an angle is formed between the contact areas and a direction oblique to the longitudinal direction of the chain.

A plate-link chain in accordance with the present invention includes a chain in which the plastic deformation of the contact areas of the plate links adjacent to the edge of the plate-link chain is greater than that for the plate links arranged at the middle of the plate-link chain. It is also appropriate for the plastic deformation of the contact areas of the plate links over the width of the chain to take on a curved-shape contact area or a shape of an $n^{th}$ degree polynomial.

Especially advantageously, the plate-link chain is stretched in a stretching process with the chain included in the conical disk gap between two pairs of conical disks, and rotation and/or torque is applied.

It is also suitable for the strain in the plate-link chain to result from a stretching process under an axial load by pressing together the conical disks and/or by pulling apart from each other the axes of the pairs of conical disks. Correspondingly, the invention also applies to apparatus for stretching a plate-link chain. Thereby, it is appropriate that the conical disks of a pair of conical disks are displaceable relative to each other or are fixed.

When stretching the plate-link chain it is appropriate for the applied torque applied during the stretching process to be substantially higher than the nominal torque that is provided during the operation of a transmission provided with a plate-link chain.

It is also appropriate for the applied torque during the stretching process to be in the range of between zero and ten times, especially three times to five times, the nominal torque during the operation of a transmission provided with a plate-link chain.

It is also appropriate for the tension in the strand of the chain during the stretching process to be higher than the nominal tension during operation of a transmission provided with a plate-link chain.

The invention also refers to a process for manufacturing a plate-link chain particularly as claimed in one of the foregoing claims. The invention also refers to a process for stretching a plate-link chain.

BRIEF DESCRIPTION OF THE DRAWINGS

Further substantive features and details of the invention are provided in the following description of embodiments that are represented in the drawings. The drawings show:

FIG. 2 is a first exemplary embodiment of a plate-link chain in accordance with the present invention in a schematic and partly sectional representation;

FIG. 3 is a top view of a rocker surface of a rocker member of the plate-link chain in accordance with FIG. 2 in a schematic, fragmentary representation;

FIG. 4 is a rocker member of the plate-link chain in accordance with FIG. 2 in a schematic, fragmentary representation;

FIG. 5b is a partly sectional view of a rocker member viewed along the line 5b—5b of FIG. 5a;

FIG. 7 is a fourth exemplary embodiment of a plate-link chain in accordance with the present invention in a schematic and partial sectional view;

FIG. 8 is plate-link chain in accordance with FIG. 7 in a schematic view; showing a top view of a rocker surface of a rocker member;

FIG. 11b is an enlarged view of a chain link of a plate-link chain in accordance with FIG. 11a;

FIG. 11c is a view of a rocker member taken along the line 11c—11c of FIG. 11a;

FIG. 11d is a partial sectional view of a rocker member taken along the line 11d—11d of FIG. 11c;

DESCRIPTION OF THE PREFERRED EMBODIMENTS

Figure 1:
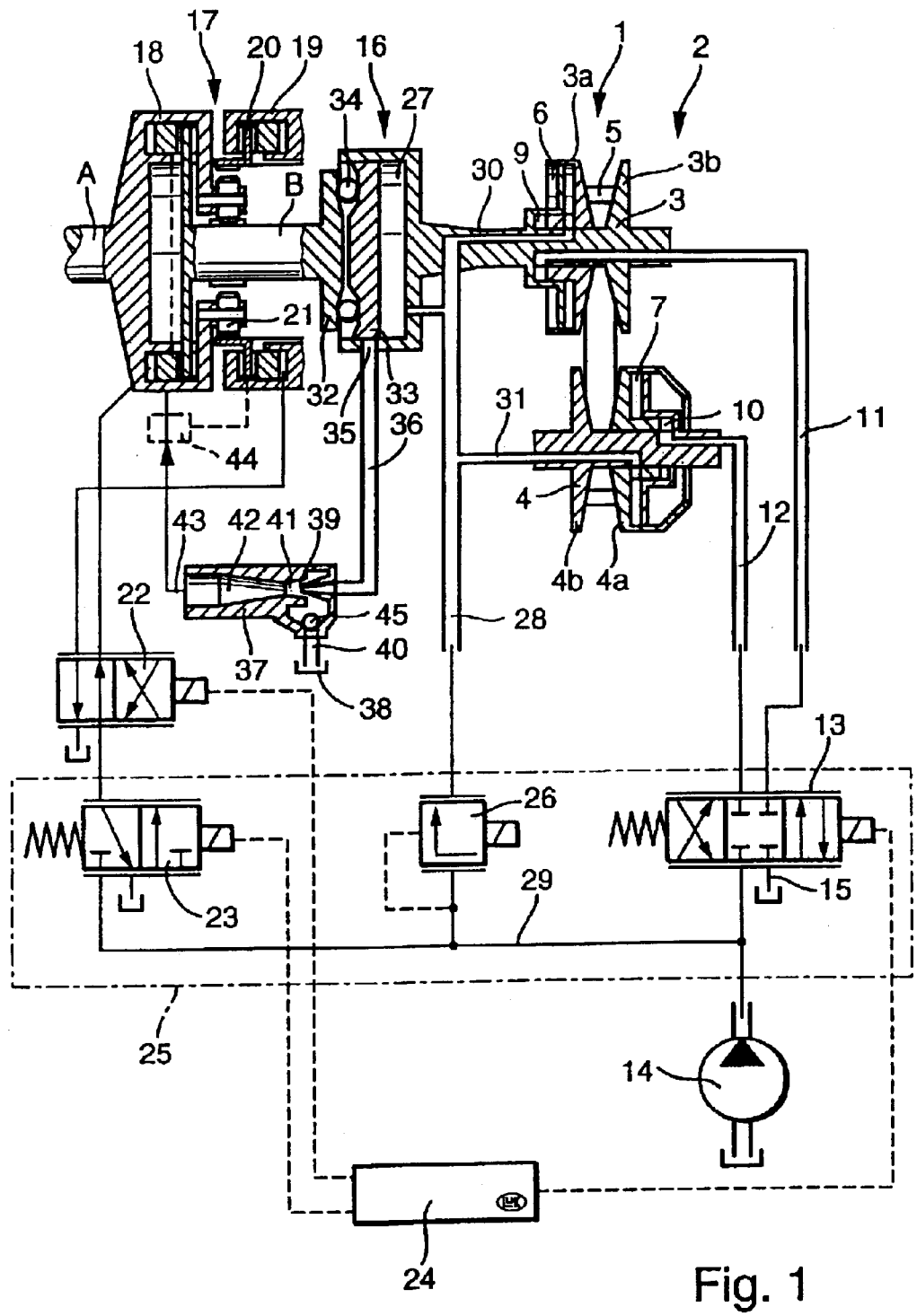
FIG. 1 is an exemplary continuously variable transmission with an embodiment of a plate-link chain in accordance with the invention in a schematic and partly sectional view.

FIG. 1 schematically shows a drive unit 1 with a conical-disk transmission 2 that includes a pair of input side disks 3 and a pair of output side disks 4. Each pair of disks includes an axially displaceable disk 3a, 4a, and for each an axially stationary disk 3b, 4b. Between the two pairs of disks an endless means in the form of a plate-link chain 5 in accordance with the present invention is provided for transmitting torque.

The pair of disks 3 is axially pressed against the plate-link chain 5 by an actuator 6 and the pair of disks 4 is axially pressed against the plate-link chain 5 by an actuator 7, the actuators being in the form of piston/cylinder units.

A further piston/cylinder unit 9, 10 is provided that is operationally parallel to each of the piston/cylinder units 6, 7, and which serves to change the transmission ratio of the transmission. The pressure chambers of the piston/cylinder units 9, 10 can alternately be filled with or drained of pressure medium corresponding with the required transmission ratio. For that purpose the conduits 11, 12 leading to the pressure chambers 9, 10 can be connected in accordance with requirements by a valve device 13, either with the pressurizing source in the form of a pump 14 or with a drain conduit 15. The change in transmission ratio of the endless-member-driven, conical-disk transmission 2 therefore results from adjustment of a pressure differential between the two actuators 9 and 10. A torque sensor 16 based on a hydro-mechanical principle is provided to produce an at least torque-dependent pressure. The torque sensor 16 transmits at least part of the input torque applied by the drive shaft A and an intermediate control clutch apparatus 17 to the pair of conical disks 3.

The clutch unit 17 includes at least a starting clutch 18 as well as an optional rotation reversing unit 19, for example for backward movement. The rotation-reversing unit includes in a known manner a clutch, that is, a brake 20, which by the interposition of a planetary gear 21 changes the direction of rotation of the intermediate shaft B.

The clutches 18 and 19 are formed as hydraulically operated clutches, which can be selectively closed or opened with the aid of the switchover valve 22. The switchover valve 22 is in series with a control valve 23, to actuate the requisite clutch 18 or 19 for the immediately existing operating condition. The clutch, for example 18, that is connected with the switchover valve 22 and the control valve 23 can therefore be closed or opened by means of the control valve 23. At least the valves 13, 22, and 23 are controlled by a central electronic unit 24, which processes the various operating parameters of a vehicle, that is, the engine and/or transmission. The hydraulic control 25 can be combined into one valve housing.

A pressure valve 26 is provided between the pump 14 and the torque sensor 16 and ensures that, with low detected torque sensor pressure, a minimum pressure is available in the conduit 29, that is, upstream of the valves 13, 23

The pressure chamber 27 of the torque sensor 16 is joined with the pump 14 through the connecting conduits 28, 29. Two conduits or ducts 30, 31 run from conduit 28 to their associated pressure chambers 6, 7, respectively, with which they communicate. Thereby a pressure level is controlled in the pressure chambers 6, 7 that depends on the pressure level delivered by the torque sensor 16. The torque sensor 16, which is constructed as a torque-controlled valve, transmits to the pair of disks 3 the torque introduced by the intermediate shaft B. In a known way the torque sensor 16 has an axially stationary cam disk 32 and an axially displaceable cam disk 33, that each have a run-up ramp. Expansion bodies in the form of balls 34 are arranged between the run-up ramps. The outlet opening 35 of the torque sensor 16 is connected with a jet pump 37 through a conduit or duct 36. Depending on the torque that exists between the two disks 32, 33, the cross-sectional area of the outlet opening 35 is correspondingly changed by the disk 33 acting as a control piston, whereby a pressure corresponding with the torque to be transmitted is set in the pressure chamber 27, in the conduits 28, 30, 31, and accordingly also in the pressure chambers 6, 7. The amount of oil draining through the outlet opening 35 is at a comparatively high pressure and therefore has a correspondingly high energy. This pressure energy is utilized in the jet pump 37 to suck-in additional fluid medium, that is, oil, from the reservoir 38 and to use it for cooling and/or lubricating purposes. The oil introduced at the inlet side into the jet pump 37 therefore serves as a propellant. This oil introduced into the jet pump 37 through the conduit 36 acquires a higher velocity at the opening of the conical jet nozzle 39, whereby the pressure is reduced considerably and the medium to be conveyed, that is, oil, can be sucked in through the conduit 40. In the collecting nozzle 41 a speed exchange takes place between the oil conducted through the conduit 36 and the oil sucked in through the conduit 40. The desired pressure in the outlet conduit 43 is set in the diffuser 42. The conduit 43 discharges into the coupling chamber of the clutch 18, so that the volume of oil conveyed through the conduit 43 can be utilized at least to cool or to lubricate the starting clutch 18 in a known manner. It can be appropriate to provide a further schematically suggested valve 44 in conduit 43, which can be constructed similar to valve 22 and alternately sets up a connection with the starting clutch 18 or the necessary clutch 19 to reverse the direction of rotation. The valve 44 can furthermore be driven by the electronic control unit 24. A part of the oil conveyed through the jet pump 37 can also be drawn upon to lubricate the belt-driven transmission 2. Moreover, in the vicinity of the conduits 36 and/or 43 branches can be provided in which a corresponding throttle is arranged, whereby the oil draining through the branches can furthermore be utilized for cooling and/or lubrication purposes.

In the inlet conduit 40 or in the jet pump 37 a check valve 45 is provided that opens in an intake direction. This check valve 45 guarantees that no outflow of cold, viscous oil can occur from the jet pump 37 through the conduit 40. At low temperatures, losses that occur in the pump 37 or in the conduits or ducts can be so high to such an extent that no additional oil can be sucked in by the jet pump 37. Also at low temperatures or with very viscous oil the operation of the jet pump 37 can be diminished. The check valve 45 guarantees that at least the oil conducted through the conduit 36 to the jet pump 37 also actually reaches the outlet conduit 43.

FIG. 2 shows a schematic and fragmentary view of an exemplary plate-link chain 100 in accordance with the present invention.

The plate-link chain 100 includes several chain links 102 that extend one after another in the direction of movement of the plate-link chain 100 indicated by the double-headed arrow 104 and are connected with each other in an articulated manner by link elements 106.

The link elements 106, whose longitudinal axes extend in the plane of the drawing, in each case include several rocker members 108, 110. These paired rocker members 108, 110 are associated with the link element 106 and each Is provided with a rocker face 112, in which the rocker faces 112 of the associated rocker members of the same link element 106 are turned toward each other, so that the rocker faces 112 of adjacent rocker members can roll against each other.

The rocker members 108, 110 extend in their longitudinal direction within through-apertures 114 in the plate links 116, whereby each of several of the plate links 116 having through-openings 114 are associated with a chain link 102 and several of those plate links 116 having through-openings 114 are associated with an adjacent chain link 102 in the direction of movement of plate-link chain 100.

Two pairs of rocker members 108, 110 are received within each through-opening 114 of the plate links 116, whereby those pairs are associated with different link elements 106. The relevant ones of the respective through-openings 114 in which both outlying rocker members 108, 110 lie, in both directions of movement 104 of plate-link chain 100 suggested by the orientations of arrows 118, 120, are interlocked and non-rotatably connected with the plate-link 116, and are axially shiftable in the longitudinal direction of the rocker members 108, 110.

Relative motion between the plate links 116 and the rocker members 108, 110 is limited or prevented by the retaining elements 122. These retaining elements 122 are in the form of wire clips. The retaining elements 122 each have two free ends 124, 126 that extend into groove-like recesses 128, 130 in the rocker members 108, 110, so that these rocker members 108, 110 are secured against sliding sideways in the direction of their longitudinal axes. The retaining elements 122 in particular are externally disposed in the longitudinal direction, that is in the direction of the longitudinal axes of the rocker members 108, 110.

On a side of the plate-link chain 100 lying outside the plate links 116 in the direction of the longitudinal axes of the rocker members 108, 110, the retaining elements 122 are arranged one after the other in the direction of movement 104 of the plate-link chain 100, so that each retaining element 122 engages two adjacent link elements 106, and that further retaining elements 122 each engage each of two consecutive link elements in the directions 118, 120 of the direction of movement 104 of the plate-link chain 100.

The retaining elements 122 can additionally engage recesses in the outer periphery 132 that is arranged outside the rocker faces 112, and particularly on the sides 134, 136 of the rocker members 108, 110 which face away from the rocker surfaces in the direction of movement 104 of the plate-link chain 100.

FIG. 3 is a top view of a rocker face 112 of a rocker member 108, 110 of a plate-link chain 100 of FIG. 2

A groove 150 is formed in the rocker face 112 in which a free end 124, 126 of the retaining element 122 can be engaged, so that the retaining element 122 and the rocker member 108, 110 can be joined together in a positive manner.

FIG. 4 is a view of the rocker member 108 in the direction of the arrow 138 of FIG. 2, wherein it is shown that the groove 150 extends into the rocker face 112.

Figure 5A:
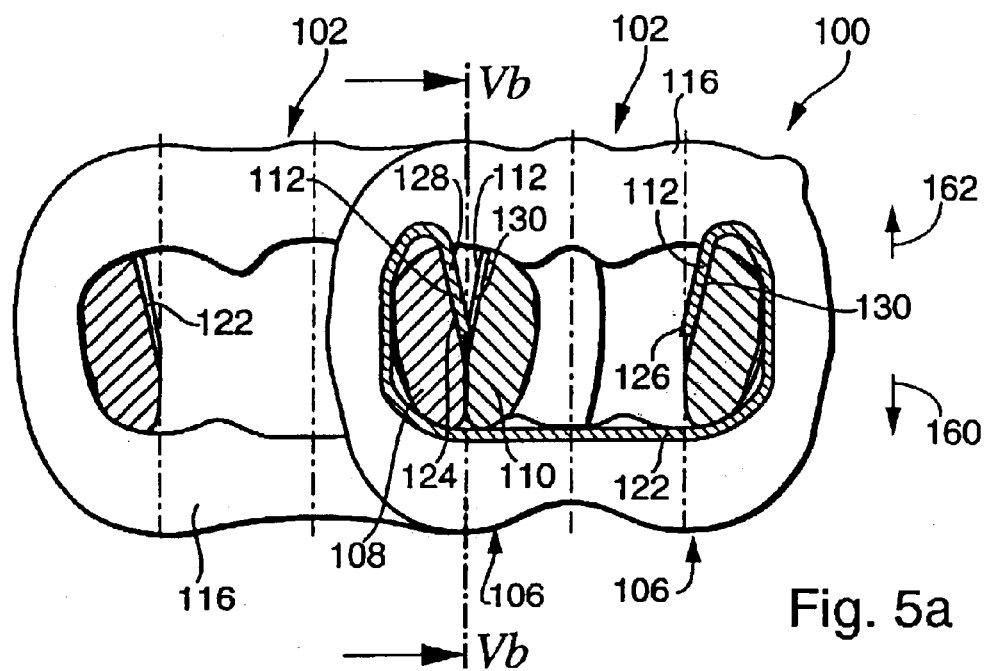
FIG. 5a is a second exemplary embodiment of the plate-link chain in accordance with the present invention in a schematic, partly sectional representation.

FIG. 5a is a schematic, partial sectional view of an exemplary embodiment of a plate-link chain 100 in accordance with the present invention in which the retaining element 122, which is formed as a wire clip, or a punched part, or the like, with its free ends 124, 126 engaged in the recesses 128, 130. The recesses 128, 130 are each ground into the rocker faces 112 of each of the rocker members 108, 110 of each of the link elements 106. The retaining element 122 engages the arrangement of the link elements 106 from below, that is, in the direction turned toward the link element axes when in the assembled condition on the conical disks that are not shown. The orientation in which the conical disk axis is positioned is schematically indicated by the arrow 160, while the opposite orientation is schematically indicated by the arrow 162.

Figure 5B:
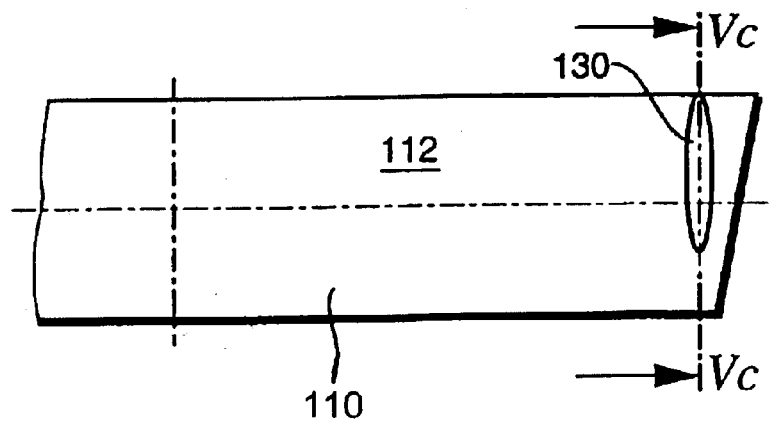

FIG. 5*b* is a top view of a rocker face 112 of a rocker member 110 viewed along the line 5*b*—5*b* of FIG. 5*a*.

FIG. 5*b* shows an exemplary location of a grooved recess 130 that extends in the rocker face 112 of the rocker member 110. The grooved recess extends from an edge of the rocker face transversely to the longitudinal direction and thereby stretches over more than 50% of the width of the rocker face 112 of the rocker member 110.

Figure 5C:
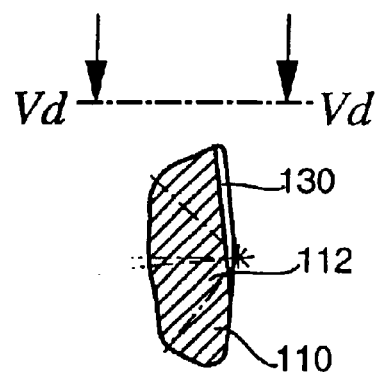
FIG. 5c is a partly sectional view of a rocker member viewed along the line 5c—5c of FIG. 5b.

FIG. 5*c* is a sectional view along the line 5*c*—5*c* of FIG. 5*b*, from which one can conclude that the depth of the grooved recess 130 in the rocker face 112 varies in the longitudinal direction of the recess 130.

Figure 5D:
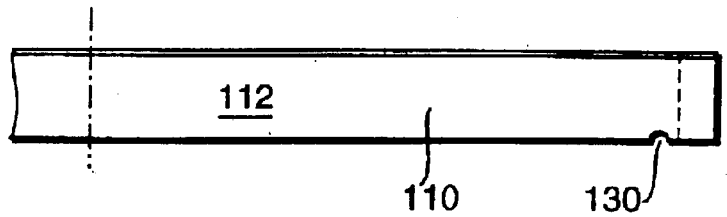
FIG. 5d is a fragmentary view of a rocker member viewed along the line 5d—5d of FIG. 5c.

FIG. 5*d* is a fragmentary view along the line 5*d*—5*d* of FIG. 5*c*, from which it is apparent that the grooved recess 130 in the rocker face 112 of the rocker member 110 has a cross section resembling a segment of a circle, and indeed particularly a semicircular cross section.

Figure 6:
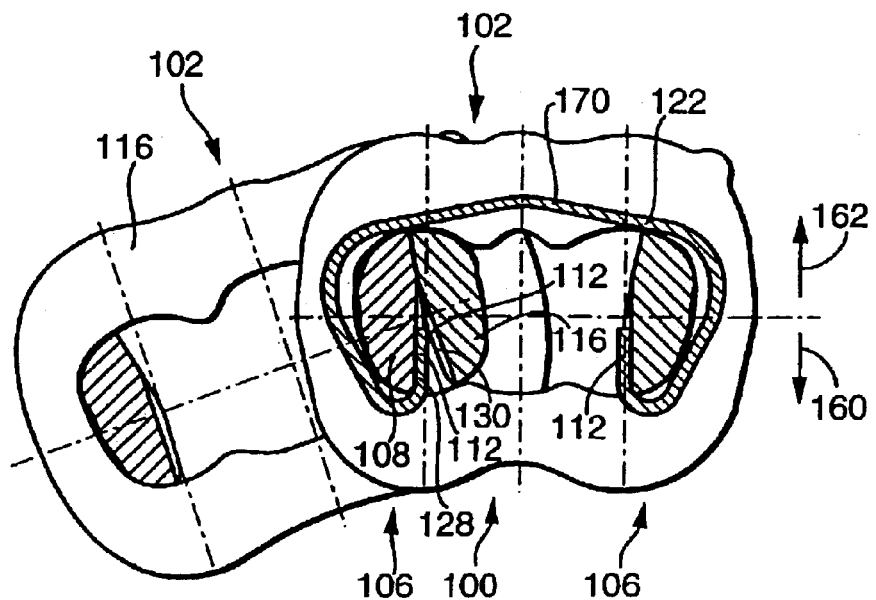
FIG. 6 is a third exemplary embodiment of a plate-link chain in accordance with the present invention in a schematic and partly sectional view.

The plate-link chain 100 shown in FIG. 6 differs from that shown in FIG. 5 especially in the shape and arrangement of the retaining elements 122. The retaining element 122 of FIG. 6 is formed with a bend in the area 170 and in addition it engages the link elements 106 from above, that is from the side opposite from the not-shown axes of rotation of the pairs of conical disks.

In the embodiment of FIG. 7 of a plate-link chain 100 in accordance with the invention, the retaining element 122 engages two link elements from outside, that is, from above, the side facing away from the not-shown axes of rotation of the pairs of conical disks, and extends into recesses 128, 130 of the rocker members 108, 110, which are arranged on the chain's inner side in the areas 180, 182, 184, 186. The inner side of the chain is that side of the plate-link chain 100 that faces the axes of rotation of the conical disks.

Where called for, additional recesses are provided in the areas 188, 190 of the rocker members 108, 110 into which the retaining element 122 extends and that are associated with each of the outer rocker members 108, 110 that are opposite from the rocker surfaces 112.

Further, FIG. 7 illustrates that a plate-link chain 100 in accordance with the invention can be made with different separations, that is with different distances between two adjacent link elements 106, 106*a*. The distance between the link elements 106*a* in the direction of movement 104 of the plate-link chain 100 is larger than the corresponding distance between the link elements 106. Correspondingly, the retaining elements 122 associated with the more closely spaced link elements 106 are shorter in the direction of movement 104 of the plate-link chain 100 than the retaining elements 122*a* associated with the more widely spaced link elements 106*a*.

FIG. 8 is a view of a rocker member 108 of a plate-link chain 100 in accordance with FIG. 7.

FIG. 8 illustrates that the grooves 192, 194 that extend through the plane of the figure and that correspond to the recesses 180, are disposed at the laterally outer ends of the rocker member 108. The rocker members 110, that together with the rocker members 108 constitute a pair of rocker members, have the same geometry as the rocker members 108, but are not shown in FIG. 8. It should be further pointed out that the rocker members 110, which, again, are not shown in FIG. 8, nevertheless can also be formed as the mirror image of the rocker members 108, and certainly with reference to a plane of symmetry that passes perpendicularly to the direction of movement 104 of the plate-link chain 100 between the similar rocker members associated as rocker members 108, 110. Furthermore, the rocker members can differ in their geometries in other ways, which likewise are not shown in FIG. 8.

Figure 9:
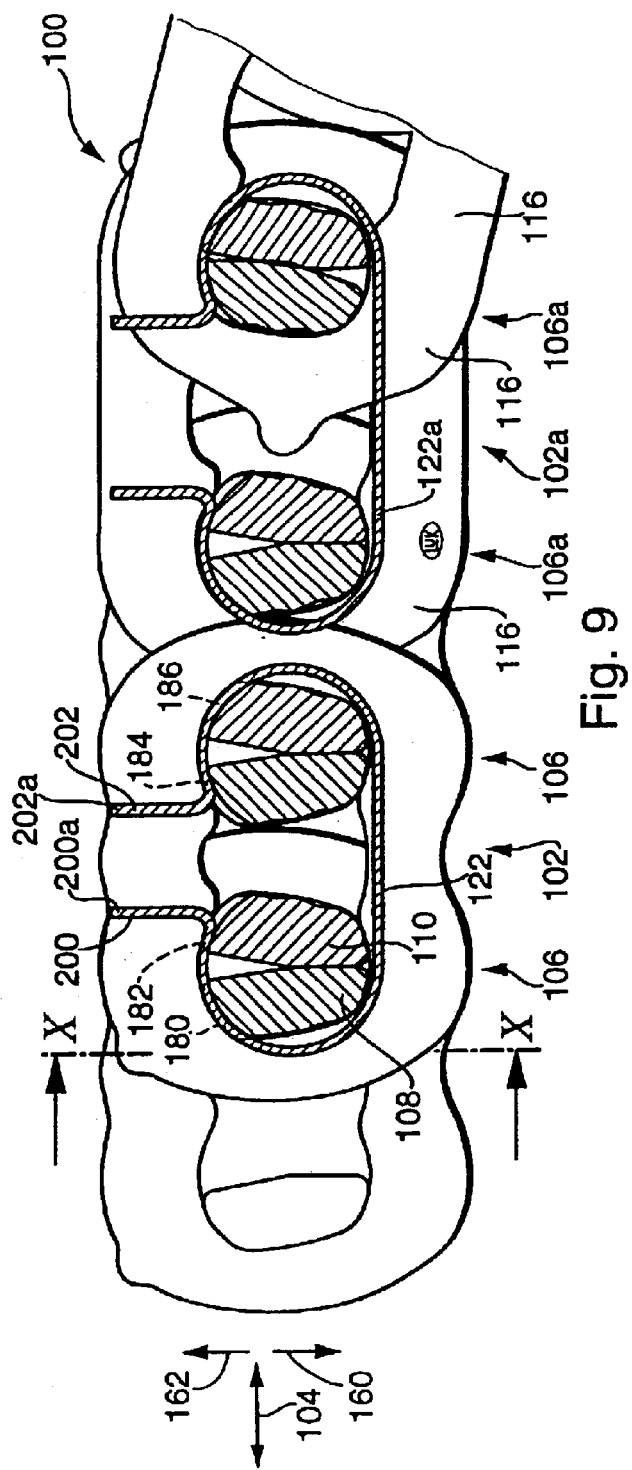
FIG. 9 is a fifth exemplary embodiment of a plate-link chain in accordance with the present invention in a schematic and partial sectional view.

FIG. 9 shows an exemplary embodiment of a plate-link chain 100 in accordance with the invention, which differs from the embodiment according to FIG. 7 especially in that the retaining elements 122, 122*a* engage from below, that is, in the direction 162 of the not-shown axes of the pairs of conical disks, that engage the link elements 106, 106*a*, as well as that the ends 200*a*202*a* of the free ends 200, 202 of the retaining elements 122, 122*a* do not lie in the recesses in the areas 182, 184, as in FIG. 7, but are bent and point outwardly from the link elements 106, 106*a*.

Figure 10:
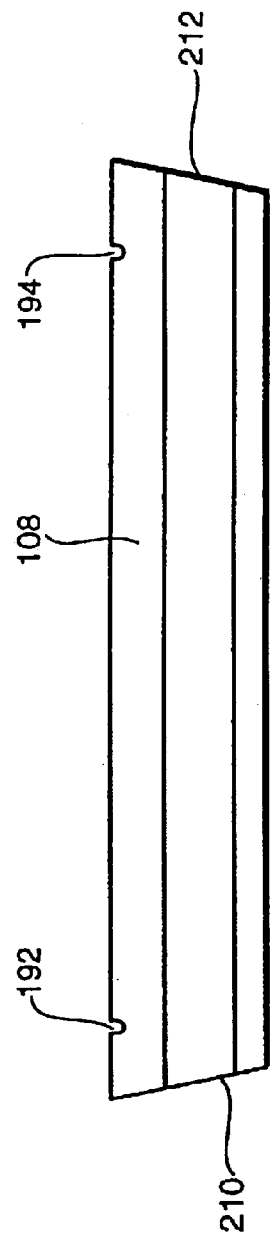
FIG. 10 is a top view of a rocker surface of a rocker member of the plate-link chain in accordance with FIG. 9 in a schematic and fragmentary view.
Figure 10A:
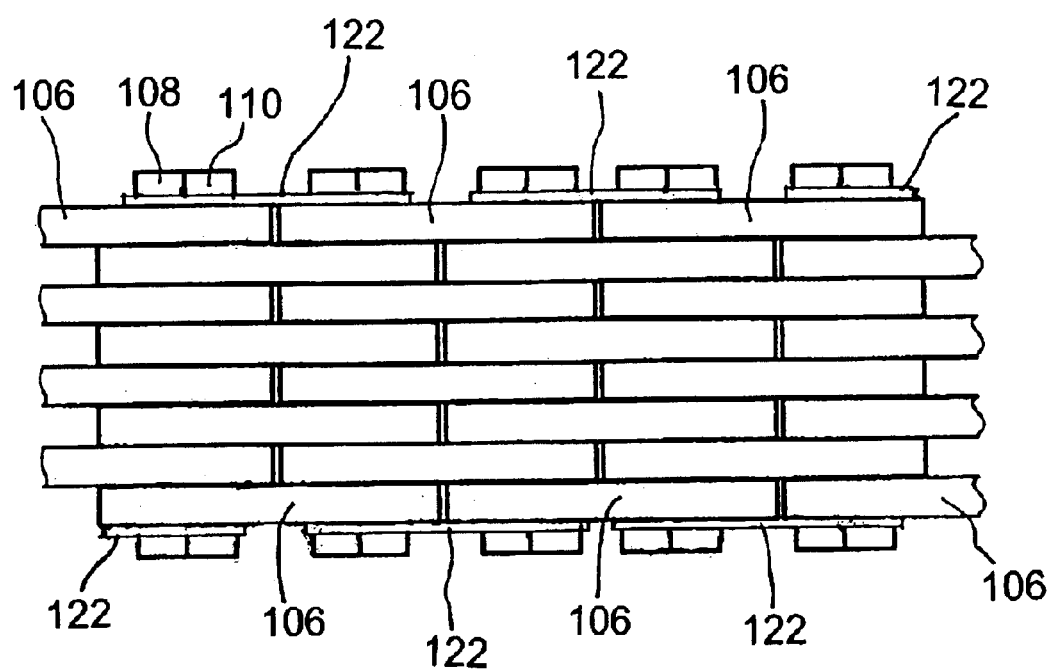

FIG. 10 shows a view of a rocker member 108 of a plate-link chain 100 as seen along the line 10—10 of FIG. 9, in which the grooves 192, 194 are shown. FIG. 10 differs from FIG. 9 particularly in that the grooves 192, 194 have another location relative to the slopes 210, 212 of the end faces of the rocker members 108, 110.

In the embodiments according to FIG. 2 through FIG. 10, the retaining elements 122 are mounted on only one side of the plate-link chain 100 or on both sides, whereby in the latter instance the retaining elements 122 that are arranged on different sides of the plate-link chain are in particular staggered in their engagement with the link elements 106.

Figure 11A:
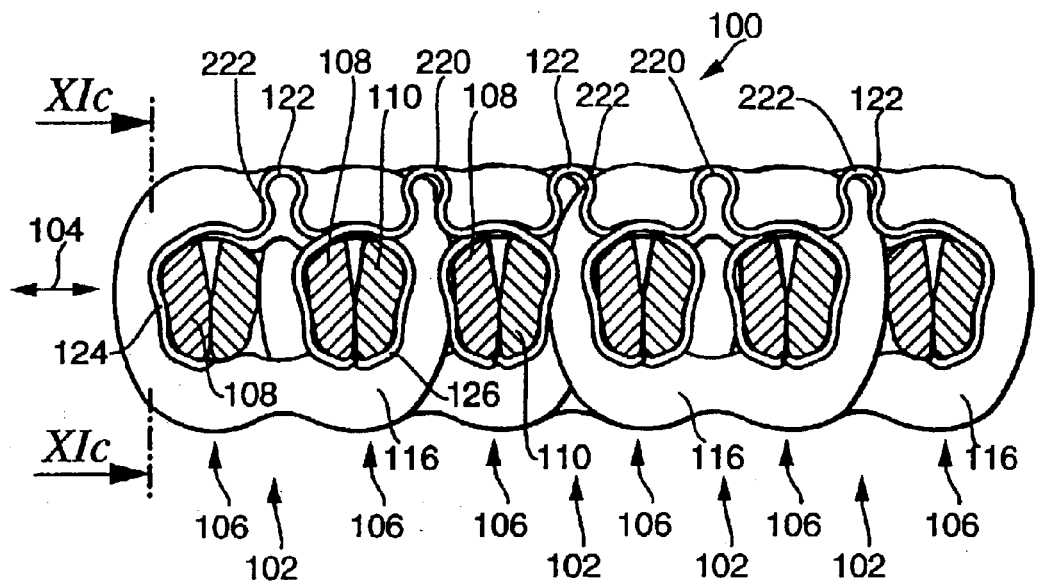
FIG. 11a is a sixth exemplary embodiment of a plate-link chain in accordance with the present invention in a schematic and partial sectional view.

FIG. 11*a* shows a sixth exemplary embodiment of a plate-link chain 100 in accordance with the invention, by which the retaining elements 122 are mounted on a first side of the plate-link chain and the retaining elements 220 on the other side of the plate arrangement, so that the retaining elements 122, 220 in each case confine from the outside the disposition of the plate links 116 in the direction of the longitudinal axes of the rocker members 108, 110.

The retaining elements 122 are connected in an interlocking manner with the rocker members 108, 110, while the retaining elements 220 are force-connected with the rocker members 108, 110 as well as the link elements 106.

The retaining elements 122, 220 are elastic in the direction of movement 104 of the plate-link chain 100, and can be formed as springs, so that in each case they load the rocker members 108, 110 in such a way that the rocker members 108,110 are pressed against each other.

The retaining elements 122, 220 in each case exhibit two free ends 124, 126 which each engage a link element 106, as well as an area 222 arranged between the free ends 124, 126, which is configured in such a way as to form a loop that is open in the peripheral direction.

Figure 11B:
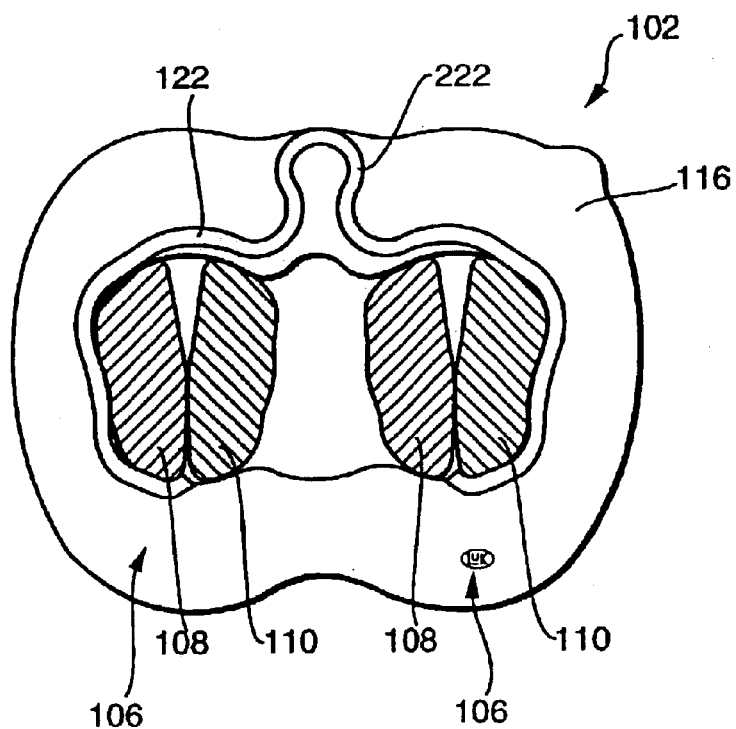

FIG. 11*b* shows, in an enlarged view, a chain link 102 in accordance with FIG. 11*a* with a retaining element 122.

Figures 11C, 11D:
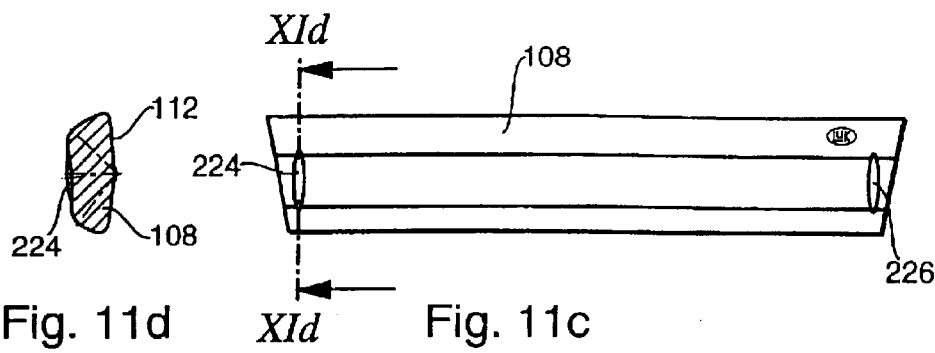

FIG. 11*c* is a view of a rocker member 108 as seen along the line 11*c*—11*c* of FIG. 11*a*.

The rocker member 108 includes at each of its longitudinally outlying areas a groove-shaped recess 224, 226, which is aligned in a substantially perpendicular direction, that is, in a cross direction, to the longitudinal axis of rocker member 108, and is arranged beyond the edge areas that lie in a cross direction of the rocker member 108. FIG. 11*d* shows a sectional view along line 11*d*—11*d* of FIG. 11*c*, wherein is shown in particular the position of the recess 224 on the side of the rocker member 108 that faces away from the rocker face 112 of the rocker member 108.

Figure 12:
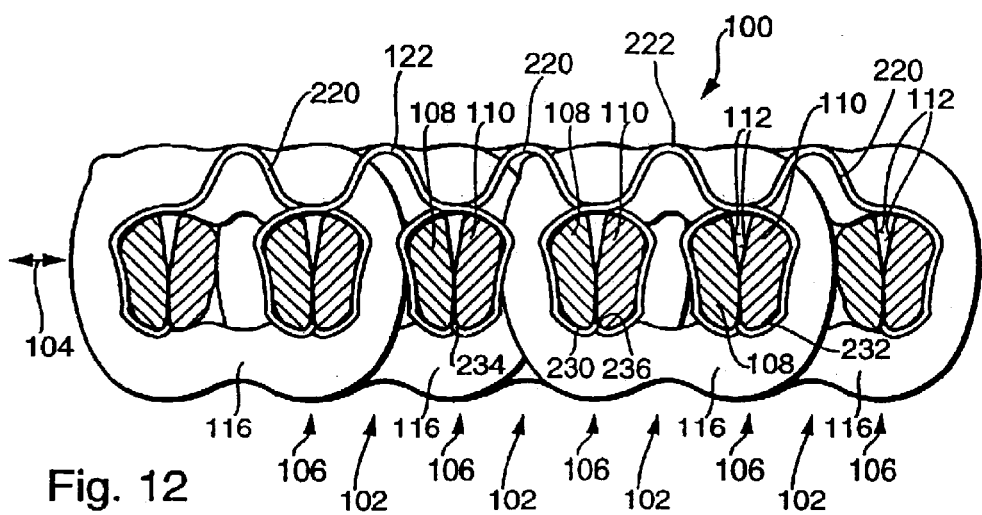
FIG. 12 is a seventh exemplary embodiment of a plate-link chain in accordance with the present invention in a schematic and partial sectional view.

FIG. 12 shows a seventh exemplary embodiment of a plate-link chain 100 in accordance with the invention, in which the retaining elements 122 are mounted on a first side of the plate-link chain 100 and the retaining elements 220 are mounted on the second side of the plate-link chain.

These retaining elements 122, 220 each engage the link elements 106 and enclose the rocker members 108, 110 in such a manner that the pairs of rocker members 108, 110 are set opposite each other in a loaded direction along the direction of movement 104 of the plate-link chain 100, so that the rocker members 108,110 can be easily pulled apart.

For that purpose, the free ends 230, 232 in particular of the retaining elements 122, 220 engage at the end areas 234, 236 of the rocker member surfaces 112.

The intermediate area 222 between the free ends 230, 232 extends from the link elements outward and is formed as a bend.

Figure 13:
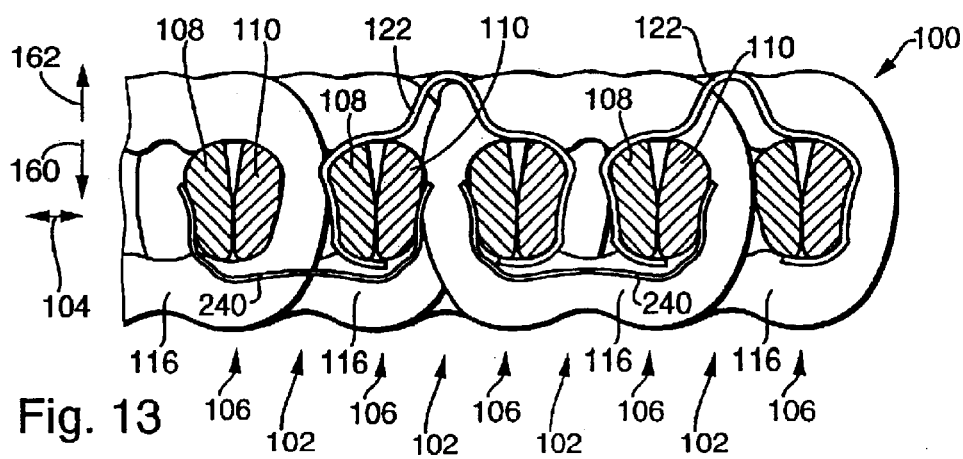
FIG. 13 is an eighth exemplary embodiment of a plate-link chain in accordance with the present invention in a schematic and partial sectional view.

FIG. 13 shows an eighth exemplary embodiment of a plate-link chain 100 in accordance with the invention, in which different retaining elements 122, 240 engage the link elements 106 from different sides of the plate-link chain 100, namely in the direction 160 in which the not-shown axes of the pairs of conical disks are arranged, as well as from a second side that is arranged in the direction of the arrow 162, that is, from a side that faces away from the axes of the conical disks.

The retaining elements 220, 240 are of different forms and advantageously are mounted on the same side of the plate-link chain in the direction of the longitudinal axis of the rocker members 108, 110. In accordance with the invention it is also intended to mount them on different sides of the plate-link chain 100.

Figure 14:
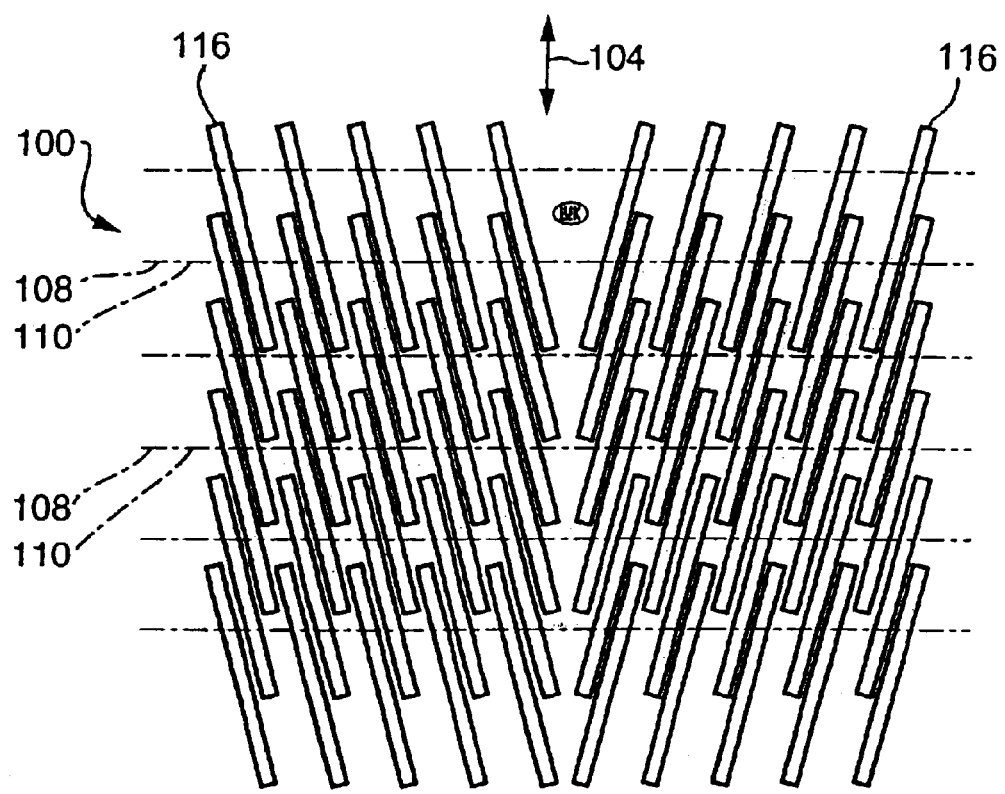
FIG. 14 is a ninth exemplary embodiment of a plate-link chain in accordance with the present invention in a schematic and fragmentary view.

FIG. 14 shows a ninth exemplary embodiment of a plate-link chain 100 in accordance with the invention, in which the plate links 116 are arranged in a V-pattern.

Figure 15:
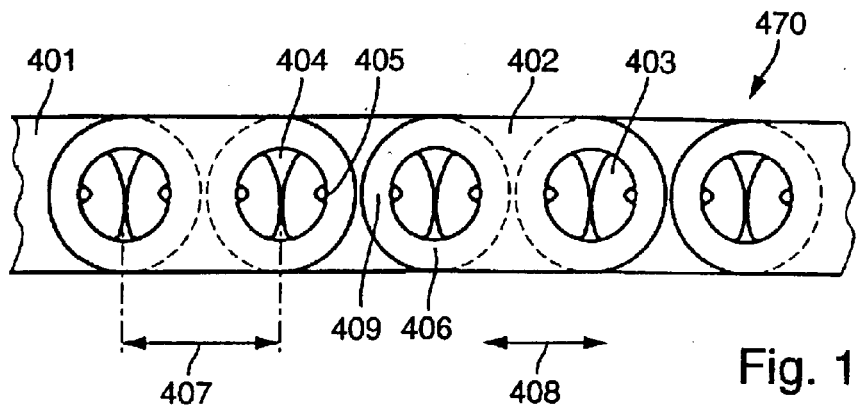
FIG. 15 is a known plate-link chain with a two-link connection in side view.
Figure 17:
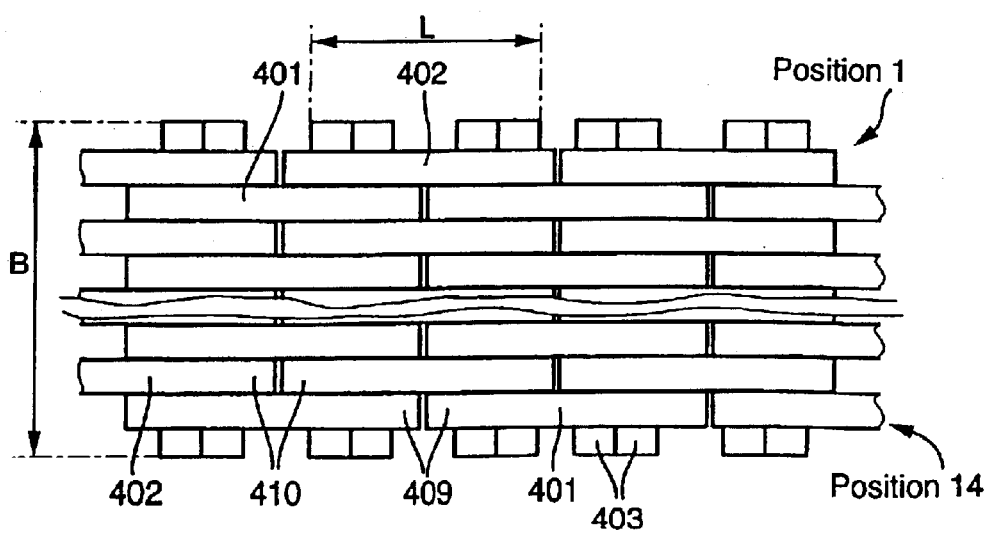
FIG. 17 is a top view of the plate-link chain in accordance with FIG. 15.

FIGS. 15 and 17 show a side view and a top view of a portion of a known plate-link chain with standard plate links 401 and 402, wherein the plate links when viewed are arranged over the width B of the plate-link chain and repeat themselves in an appropriate arrangement pattern. The plate links form link sets in series. The chain links formed by the plate links 401 and 402 are articulated by articulation members that are connected with each other, which are composed of pairs of rocker members 403, which are inserted into clearances 404 of the plate links and are rotatably coupled and connected by an interlocking connection 405 with the particular associated plate links. The clearances 404 can be formed in such a way that there are two clearances formed per plate link for both links, or also that per plate only one clearance is provided to receive rocker members for both links. The rocker members 403 have rocker faces that are directed toward each other and that can roll against each other, at least some concave, for example, which permits the link movement of adjacent chain links. The rocker faces can both be concave or one rocker face can be flat or convex and the other rocker face is concave.

Such plate-link chains can be formed in such a way that at the very least some rocker members are at least partially non-rotatably connected with their plate links associated with their chain links.

The individual links have a center-to-center spacing 407 that in general is designated the chain pitch. The magnitude of the chain pitch 407 depends on the given extent of the rocker members 403 in the direction of movement 408 of the chain, as well as on the necessary spacing between the individual clearances 404. It is generally known that the chain pitch 407 is designed to remain unchanged over the full chain length, it can, however, also vary irregularly within given limits if necessary, in order to favorably influence the noise developed by the chain.

The rocker members have end faces at their side end areas with which they can frictionally engage the conical disks during operation of a transmission. At their lateral end zones, the rocker members are fitted with end surfaces allowing them to come into frictional contact with the conical disks during transmission operation. It is advantageous for both rocker members to have the same length, so that both rocker members are in contacting engagement with the conical disk. In another embodiment it is appropriate to provide rocker members having different lengths and thereby only one rocker member per link is in frictional contact with the conical disk.

It can be seen from the top view of FIG. 17 that the chain is assembled as a double-link unit, which means that in each case two radial end links 409, 410, respectively, of adjacent chain links are positioned next to each other between two pairs of rocker members 403, whereby the spacing of those links formed by pairs of rocker members is correspondingly determined.

Figure 18:
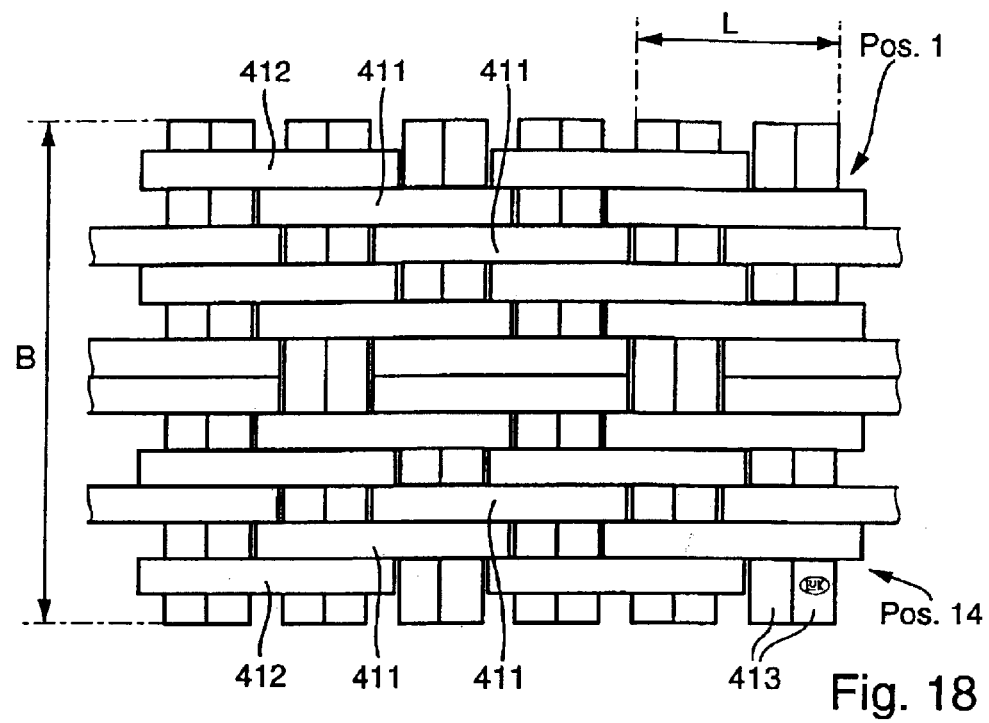
FIG. 18 is a top view corresponding with FIG. 17 to represent a three-link band of a known plate-link chain in accordance with FIG. 16.

It can be seen from the top view of FIG. 18 how known chains can be constructed as triple-link units. Here can be seen over the width of the chain the standard plate links 411 and the outer plate links 412 that are set against each other in each case and separated in the direction of chain movement, whereby on the other hand, however, the spacing between links assembled by pairs of rocker members can be reduced compared with the double-link unit in accordance with FIG. 17.

Figure 16:
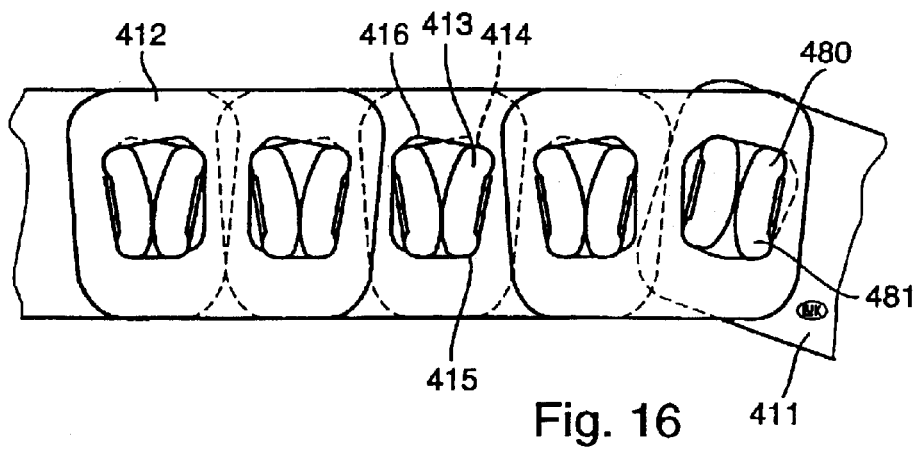
FIG. 16 is a side view of another construction of a known plate-link chain.

The top view of FIG. 18 corresponds with another known chain construction, shown in a side view in FIG. 16, having standard plate links 411 and outer plate links 412, whereby the articulation members are composed of pairs of rocker members 413. These rocker members 413 are shaped in such a way that they only lie against the plate link recesses 416 at two positions 414 and 415. Between the contact positions 414 and 415 the rocker members 413 are free of the plate links 411, 412 of the chain.

Figure 19:
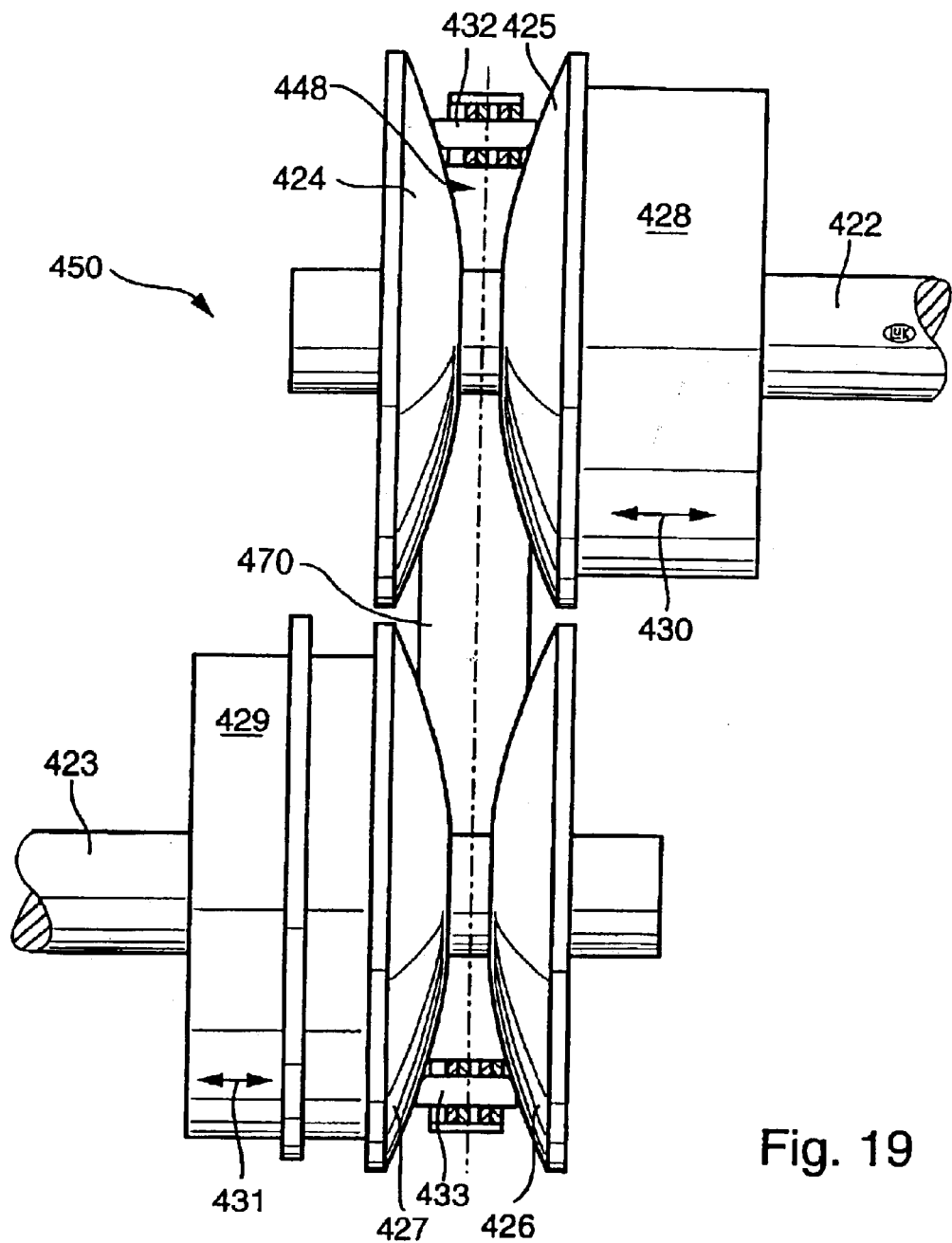
FIG. 19 is a schematic representation of an apparatus for extending a plate-link chain.

FIG. 19 shows an arrangement 450 to stretch a plate-link chain 432 in accordance with the invention, whereby the plate-link chain 432 is received in a conical disk gap 448 between two sets of conical disks. The arrangement of FIG. 19 can, however, also act as a loop-driven conical pulley transmission, which in operation includes a chain in accordance with the invention. One set of conical disks is formed by the two conical disks 424 and 425 that are axially displaceable relative to each other. The one conical disk 425 is axially movable, see arrow 430. The adjusting cylinder 428 serves to axially displace the chain and to press it against the set of conical disks.

The other set of conical disks is formed from the two conical disks 426 and 427 that are axially displaceable relative to each other. For that purpose one conical disk 427 can be shifted axially, see arrow 431. The adjusting cylinder 429 serves to axially displace the chain and to press it against the set of conical disks. The rotational speed and/or the torque can be adjusted by the input side shaft 422 and the output side shaft 423.

According to another embodiment of an apparatus for stretching a plate-link chain, it can be advantageous for the axes or shafts of the apparatus to be pulled away from each other by the application of a force, so that the plate-link chain is forced into the conical-disk gap and so the power transmission between the plate-link chain and the conical disks can be set at the desired value. In addition, it is not absolutely necessary that the conical disks of the pairs of conical disks be axially displaceable relative to each other.

It can also be suitable that the conical disks are rigidly affixed to each other.

When stretching the chain in the loop direction after assembly, the individual links of the plate-link chain will be tight against the rocker members. Thereafter it will be placed in a variable speed unit, for example in accordance with FIG. 19. The chain is stretched in the loop direction by the compression between the rocker members and the conical disks and/or by torque transmission. In addition, there will be set a multiple of the pressing forces and torques that normally appear in a transmission, and the chain will be allowed, for example, to run through the variable speed unit with fewer revolutions, so that each chain link, such as plate links and rocker members, passes around the variable speed unit at least once or several times. It is advantageous for the chain to be rotated slowly and with fewer revolutions, compared with the conditions in a motor vehicle transmission.

Typically the stretching process can be carried out in the starting gear ratio (underdrive), whereby the torque of the variable speed unit is adjustable within the range of from zero to ten times the nominal torque, that is, the maximum torque that occurs in the transmission. In particular, a torque in the range of approximately three times the maximum moment of the variable speed unit is set. It is also appropriate that the tension in the strand 470 is larger during the stretching process than during operation of the transmission. Advantageously, the tension is at least twice the maximum tension during normal transmission operation.

The plate-link chain is then rotated at a low rotational speed in the range of about 0.5 revolutions per minute to about 500 revolutions, advantageously from about 10 revolutions per minute to 50 revolutions per minute, over several revolutions or passes. It can be appropriate depending upon the plate-link chain to perform 1 to 20 revolutions.

In accordance with the invention, the transmission ratio can also be changed during the stretching process.

In that way the load distribution is set in a manner corresponding substantially with underdrive (starting gear ratio) in the vehicle. During one stretching process, however, another transmission ratio can also be set during the stretching process, such as, for example, an overdrive transmission ratio or a variable transmission ratio. The advantage of the stretching process in the wrap-around member is that the chain is stretched substantially at each bend of the chain that occurs during operation, and as a result the load distribution is similar to the actual load distribution during operation of the transmission.

As a result of the stretching process in the wrap-around member, and on the basis of the contact pressure and/or the torque loading of the chain that is loaded in that manner, the rocker members, considered relative to the shaft of the set of disks, are elastically deformed or bent in the radial direction as well as in the circumferential direction. As a result, considered over the width of the chain, the outwardly-disposed plate links are more heavily loaded than the plate links disposed in the middle of the chain. That has the result that the outer plate links or those plate links disposed on the edge are more greatly elongated than the plate links disposed inwardly, and those outer plate links experience a higher degree of stretching than the inner plate links. By the degree of stretching is meant the condition between the loading by stretching and the condition of ultimate load.

Moreover, it can be appropriate, for the plate links of one plate-link row which when assembled have the same length, for those plate links to be elongated differently as a function of the width.

Likewise, it can be appropriate for the plate links of one plate-link row when assembled to already exhibit different lengths and plate-link inner widths, respectively, so that the plate links disposed at the edge of the chain exhibit a larger plate-link inner width than the middle plate links. That can be especially appropriate when stretching is not of the loop member, but, on the contrary, the plate links are stretched before assembly and the plate links are thereafter assembled together to form a chain. Then one can, on the basis of the assembly of the plate links having different plate-link inner widths, construct a chain that already has at its edges longer plate-link inner widths than in the middle. That is shown in exemplary form in FIG. 26. There it is shown that the plate-link inner width as a function of the position of the plate links is greater at the edge than in the middle. That can result both from the stretching process in the loop member as well as from the assembly of different length plate links in accordance with the invention.

The plate links that are stretched by a stretching process before assembly can be stretched with different degrees of stretch, and during assembly they can be constructed in such a way that the plate links with a higher degree of stretching are arranged at the edge of the chain. That has the result that the outer plate links or those plate links arranged at the edge are more highly plasticized and loaded than the inwardly-arranged plate links, and those outer plate links experience a higher degree of stretch than the inner plate links. That is shown in exemplary form in FIG. 25. There it is shown that the degree of stretching as a function of plate link position is greater at the edges than in the middle area. That can result both through the stretching process of the loop member and also through the assembly of various highly-stretched plate links in accordance with the invention.

Figure 20:
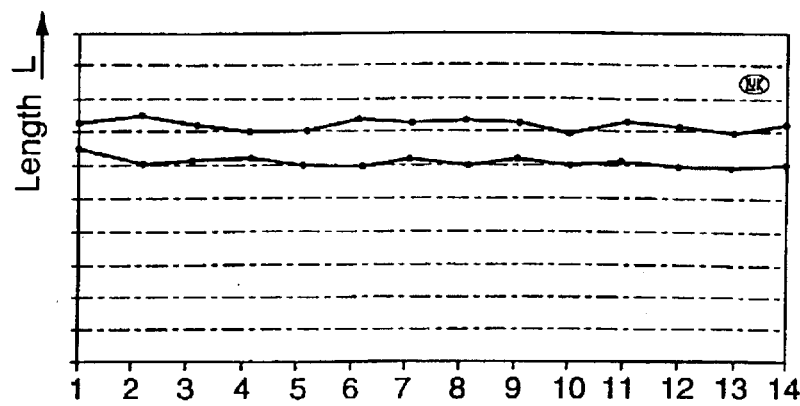
FIG. 20 is a graph showing relative plate link length as a function of width-wise position of the links for an unstretched chain.
Figure 21:
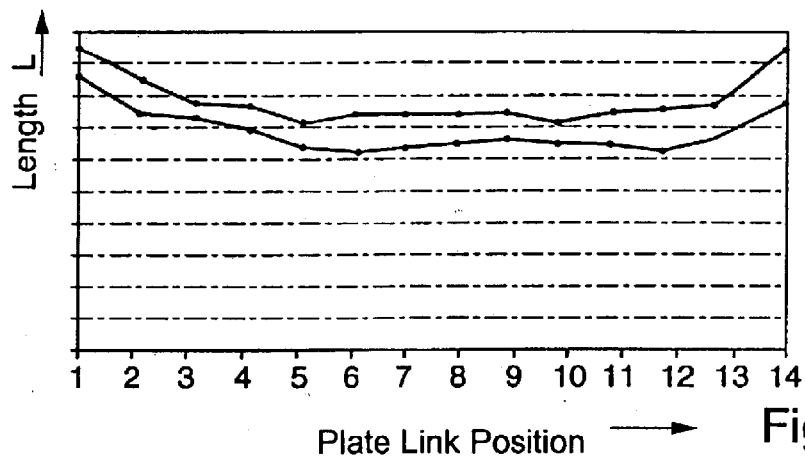
FIG. 21 is a graph showing relative plate link length as a function of width-wise position of the links after stretching of a chain.
Figure 22:
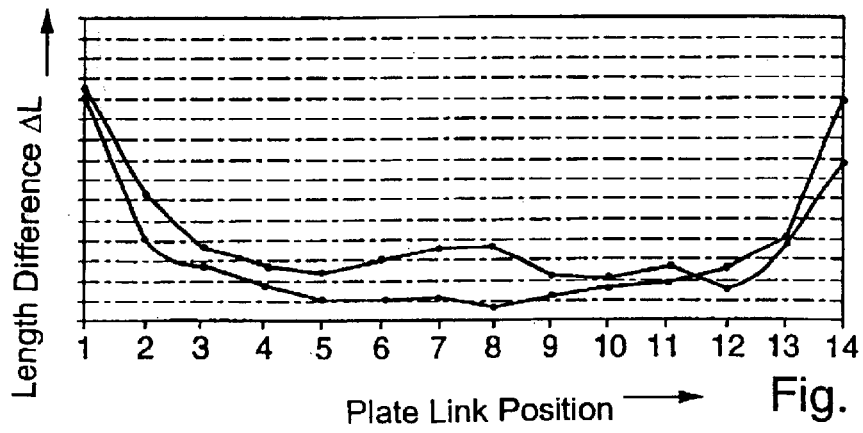
FIG. 22 is a graph showing relative change of plate link length as a function of width-wise position of the links for a dynamically stretched chain.

FIGS. 20 through 22 show in graphs the condition of the lengths of the plate links considered as a function of their disposition across the width of the chain. On the y-axes of FIGS. 20 and 21 are shown the lengths of the plate links and the length of the spacing L between both contact areas of one plate link, respectively. The length L also represents the plate link inner width. In FIG. 22 is shown the length difference ΔL of the plate links between an unstretched and a stretched condition in accordance with the invention. Shown along the x-axes of each of FIGS. 20 through 22 is the position of the plate links across the width of the chain. Position 1 corresponds with the position of the plate link on one side of the chain and position 14 corresponds with the position of the plate link on the other side of the chain. Positions 2 through 13 correspond with the plate link positions between the edge plate links 1 and 14. Thereby there is shown specifically a chain with 14 plate link positions across the width of the chain as an illustrative embodiment, though other chain variations can also be included without restrictions on generality.

FIG. 20 shows a graph of an unstretched chain or a stretched open chain in straight condition. The length L as a function of the plate link position 1 through 14 is substantially equal and constant.

FIG. 21 is a graph of a chain that has been dynamically stretched in the wrap-around, closed condition. The length L variation is a function of the plate link position 1 through 14, whereby the edge plate links in positions 1 through 3 and 12 through 14 are more highly stretched than the plate links at the middle plate link positions 4 through 11. This result is based on the radial and circumferential bending of the rocker members and the corresponding high plastic deformation of the contact areas of plate links that are disposed at positions at the edge or near the edge.

FIG. 22 is a graph of a chain that has been dynamically stretched in the wrap-around, closed condition. The length difference ΔL variation is a function of the plate link positions 1 through 14, whereby the edge plate links in positions 1 through 3 and 12 through 14 are more highly stretched than the plate links at the middle plate link positions 4 through 11. This result is based on the radial and circumferential bending of the rocker members and the corresponding plastic deformation of the contact areas of plate links that are disposed at the edge or near the edge. The presentation in FIG. 22 clearly illustrates once again the inventive effect to increase the efficiency of the chain.

The small fluctuations in the length L, that is, in the elongation ΔL in the middle area results from measurement errors.

The elongation of the plate links during the stretching process produces a plastic deformation of the plate links in the contact areas between the plate links and the rocker members.

Through the particularly radially- and/or circumferentially-directed bending of the rocker members there results a plate link plastic deformation, which accommodates the angle between the movement direction and the rocker member.

Figure 23:
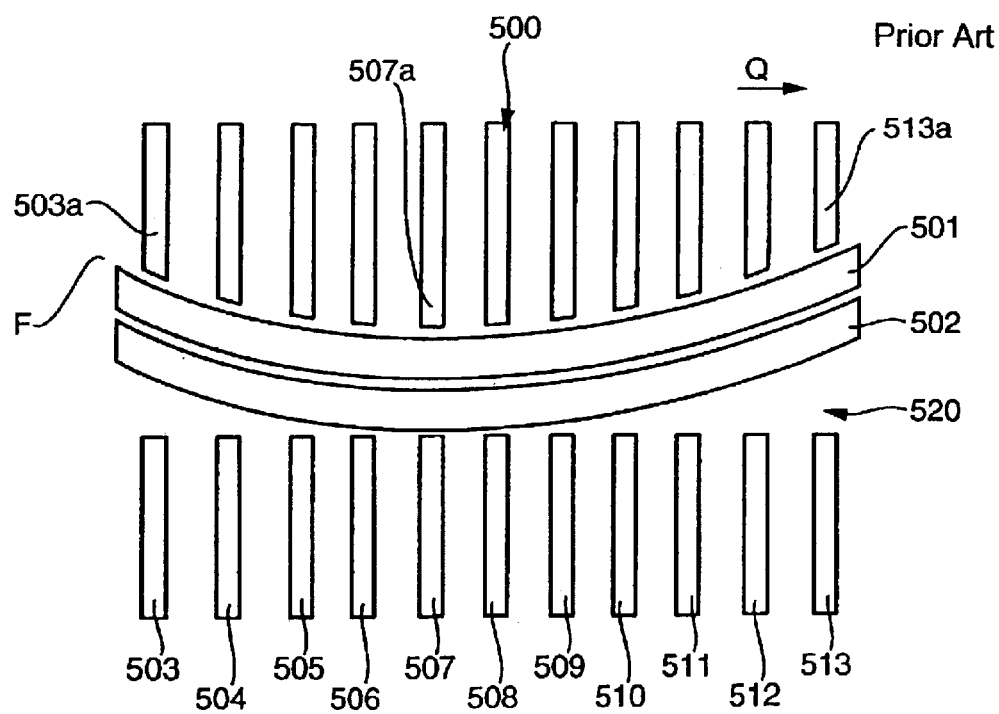
FIG. 23 is a representation of the extension of links.

FIG. 23 shows a section of a chain 500 with rocker members 501 and 502, which are received in clearances 520 of the plate links 503 through 513. The rocker members are represented as bent in the manner that they can be bent in a dynamic stretching process in the wrap-around mode, such as, for example, in the disk wedge. The representation is for clarification and is of course a somewhat exaggerated representation.

Figure 23A:
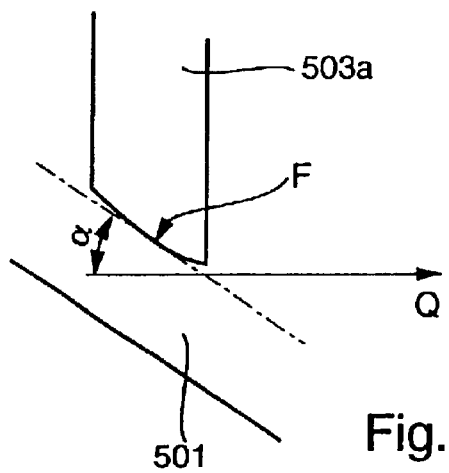
FIG. 23a is a cutaway portion of FIG. 23.
Figure 23B:
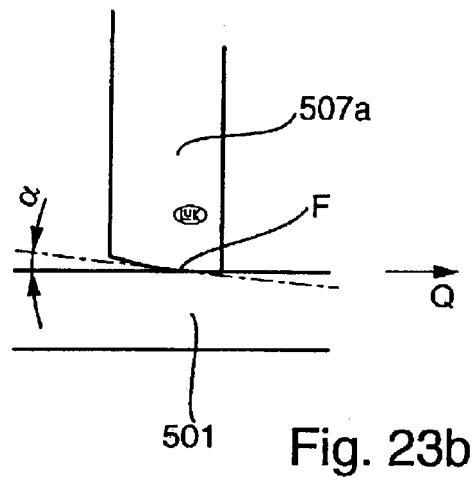
FIG. 23b is a cutaway portion of FIG. 23.

The contact areas 503a through 513a are plastically deformed by the bending of the rocker members 501 and 502 and match their contour with that of the rocker members. It is shown that the outer plate links are more severely elongated and the plastic deformation leads to a larger angle at between the chain transverse direction Q and the contact surface F than at a middle plate link such as, for example, 507. FIG. 23a and FIG. 23b each show a cutaway portion.

The angle α increases moving from the middle of the chain to the outside.

Figure 24:
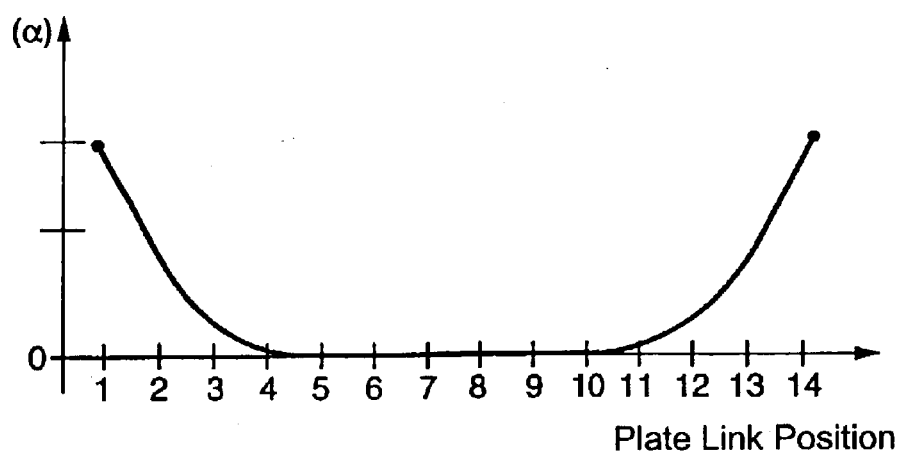
FIG. 24 is a graph of contact area angle as a function of width-wise position of the links.

FIG. 24 shows a graph in which the angle α is shown as the value |α| represented as a function of the plate link position. The angle increases outwardly toward the edges and returns to zero at the middle area. That can be achieved in accordance with the invention by stretching the loop member or, suitably by a further object of the invention, also by stretching the plate links in such a way before assembly, in which they are stretched to different angles α and are subsequently mounted together to a chain.

Figure 25:
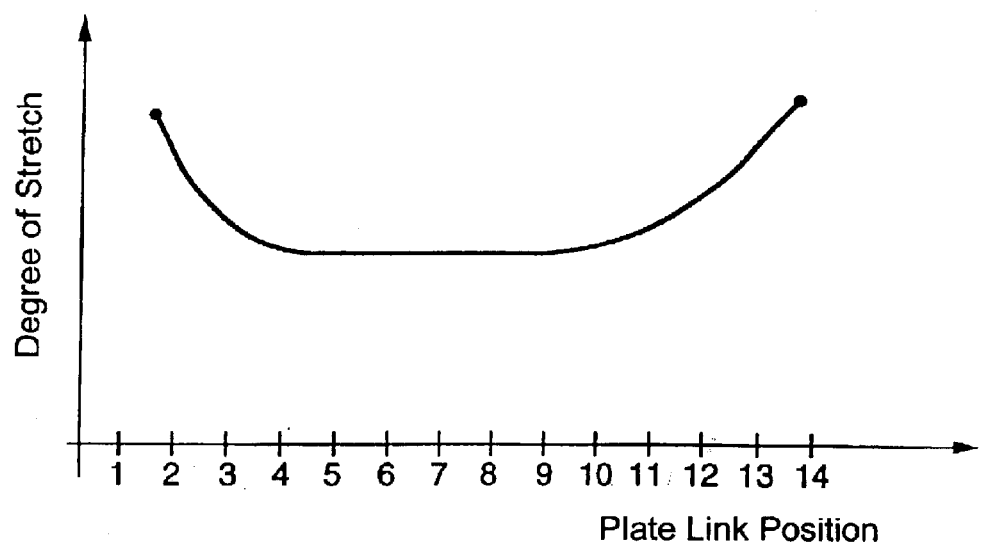
FIG. 25 is a graph of degree of stretch as a function of width-wise position of the links.
Figure 26:
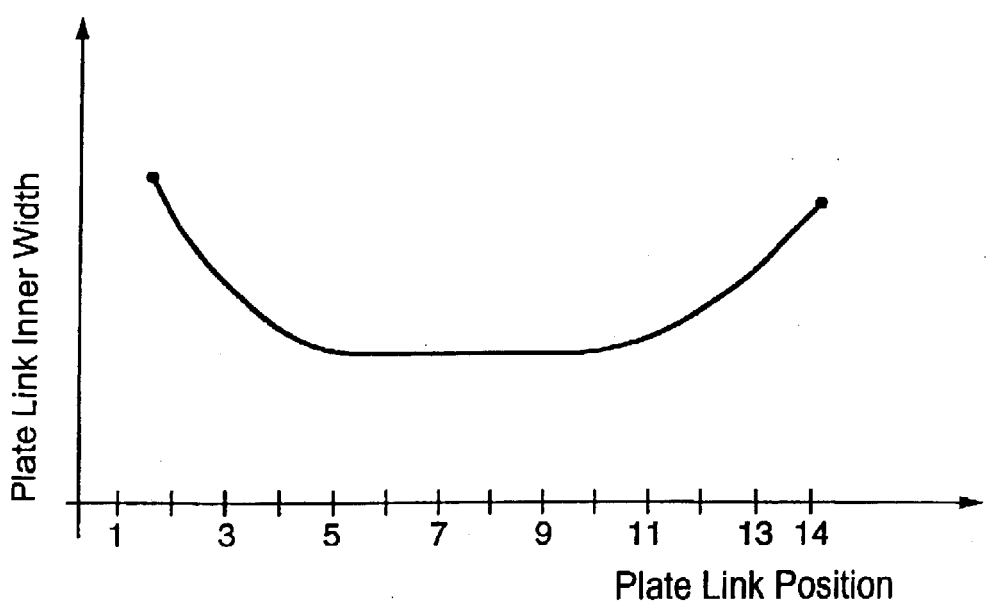
FIG. 26 is a graph of plate link inner width as a function of width-wise position of the links.

FIGS. 25 and 26 show that degree of stretch of the plate links, and the plate link inner width, respectively, as a function of width-wise plate link position.

The plates near the edge are more highly loaded by the stretching in accordance with the invention than by a stretching process on a straight strand. Thereby the plate links at the edge are more highly elongated and the degree of stretch is higher.

Through the proper stretch loading of the chain by the stretching process the chain will be preconditioned in such way that during later operation of the chain in a transmission the loading will be equalized and the chain will therefore experience a longer service life.

Furthermore it is advantageous, for thereby reducing the loading on the chain, that the force introduction by the rocker members to the link elements, by a two-area contact 480, 481 in conformance with FIG. 16, be equalized in both areas. Regarding that, reference is particularly made to German patent application DE 30 27 834, the contents of the disclosure of which expressly forms part of the content of the foregoing application.

Figure 27:
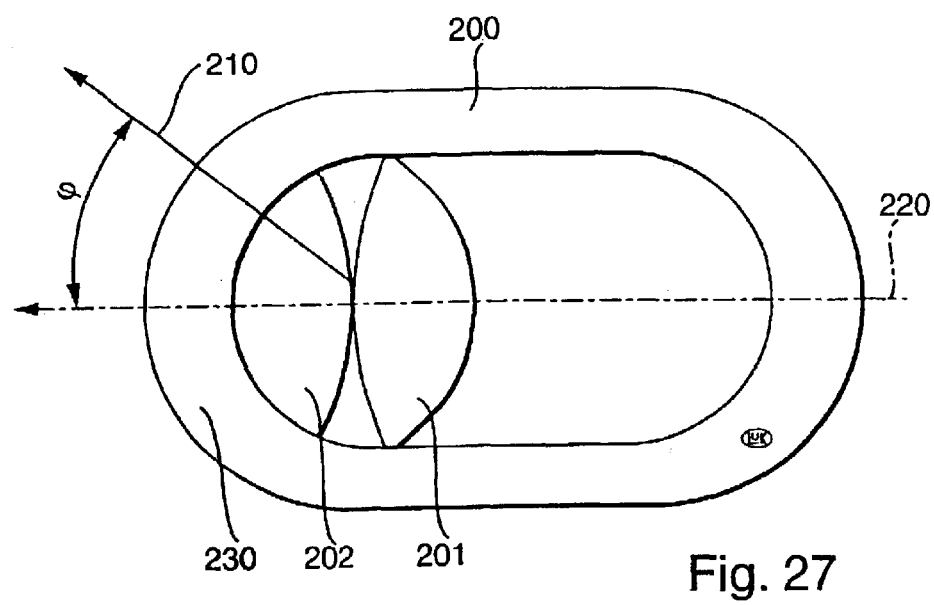
FIG. 27 is a view of a link.

FIG. 27 shows a detail of a plate link 200 with rocker members 201 and 202, wherein the plate link is stretched in such a way by a stretching process that the force introduction of the stretching force 210 is oriented at an angle ϕ to the plate link, that is, to the chain length direction 220. During a stretching operation the angle ϕ will be varied so that it extends from about 60 degrees to about 31 60 degrees, so that the contact areas 230 will be stretched and plastically deformed over a wide angular range.

Figure 28:
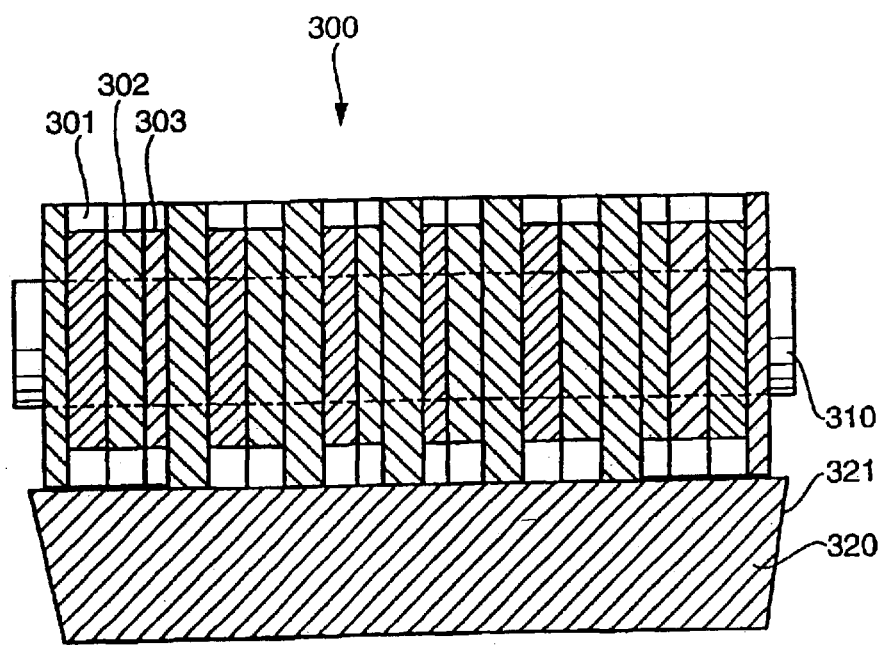
FIG. 28 is a plate-link chain in section.

FIG. 28 shows a plate-link chain 300 in section, in which next to the plate links 301, 302, 303 and the rocker members 310 there exist cross pins 320 as a hinge for torque transmission between the conical disks and the chain. The frictional force transmission results from the end faces 321 of the cross-pins.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method of increasing the load-carrying capacity of a plate-link chain, said method comprising the steps of:
    a) providing a first pair of conical disks that are rotatable about a first axis of rotation, and a second pair of conical disk that are rotatable about a second axis of rotaton, wherein the first and second axes of rotation are substantially parallel to each other and the first and second pairs of conical disks are opposite each other;
    b) installing a closed loop chain on the respective conical disks so that the chain firmly engages portions of each of the pairs of conical disks, and so that portions of the chain between the pairs of conical disks define straight chain segments, wherein the chain is formed by a plurality of side-by-side plate links and a plurality of end-to-end plate links, and a plurality of rocker members that extend transversely through openings formed in the plate links to interconnect adjacent plate links to form a closed loop chain;

c) applying a tensile force to the chain to cause the rocker members to press tightly against adjacent inner surfaces of the plate-link openings to conform the shape and orientation of contacting areas of the plate-link openings and of the rocker members with each other, wherein the tensile force applied to the chain is generated by applying a torque to at least one of the pairs of conical disks, and wherein the applied torque is greater than a nominal torque that is applied to the chain when it is operatively connected to a power transmission system.

2. A method of increasing the load-carrying capacity of a plate-link chain, said method comprising the steps of:

a) providing a first pair of conical disks that are rotatable about a first axis of rotation, and a second pair of conical disks that are rotatable about a second axis of rotation, wherein the first and second axes of rotation are substantially parallel to each other and the first and second pairs of conical disks are opposite each other;

b) installing a closed loop chain on the respective conical disks, so that the chain firmly engages portions of each of the pairs of conical disks and so that portions of the chain between the pairs of conical disk define straight chain segments, wherein the chain is formed by a plurality of side-by-side plate links and a plurality of end-to-end plate links, and a plurality of rocker members that extend transversely through openings formed in the plate links to interconnect adjacent plate links to form a closed loop chain;

c) apply a tensile force to the chain to cause the rocker members to press tightly against adjacent inner surfacer of the plate-link openings to conform the shape and orientation of contacting areas of the plate-link openings and of the rocker members with each other, wherein the tensile force applied to the chain is generated by applying a torque to at least one of the pairs of conical disks, and wherein the applied torque is from about three to about five times a nominal torque that is applied to the chain when it is operatively connected to a power transmission system.

3. A method of increasing the load-carrying capacity of a plate-link chain, said method comprising the steps of:

a) providing a first pair of conical disks that are rotatable about a first axis of rotation, and a second pair of conical disks that are rotatable about a second axis of rotation, wherein the first and second axes of rotation are substantially parallel to each other and the first and second pairs of conical disks are opposite each other;

b) installing a closed loop chain on the respective conical disks so that the chain firmly engages portions of each of the pairs of conical disks, and so that portions of the chain between the pairs of conical disks define straight chain segments, wherein the chain is formed by a plurality of side-by-side plate links and a plurality of end-to-end plate links, and a plurality of rocker members that extend transversely through openings formed in the plate links to interconnect adjacent plate links to form a closed loop chain;

c) applying a tensile force to the chain to cause the rocker members to press tightly against adjacent inner surfaces of the plate-link openings to conform the shape and orientation of contacting areas of the plate-link openings and of the rocker members with each other, and wherein the tensile force applied to the chain is provided by drawing apart the axes of the pairs of conical disks.

4. A method of increasing the load-carrying capacity of a plate-link chain, said method comprising the steps of:

a) providing a first pair of conical disks that are rotatable about a first axis of rotation, and a second pair of conical disk that are rotatable about a second axis of rotation, wherein the first and second axes of rotation are substantially parallel to each other and the first and second pairs of conical disks are opposite each other;

b) installing a closed loop chain on the respective conical disks that the chain firmly engages portions of each of the pairs of conical disks, and so that portions of the chain between the pairs of conical disks define straight chain segments, wherein the chain is formed by a plurality of side-by-side plate links and a plurality of end-to-end plate links, and a plurality of rocker members that extend transversely through openings formed in the plate links to interconnect adjacent plate links to form a closed loop chain;

c) applying a tensile force to the chain to cause the rocker members to press tightly against adjacent inner surfaces of the plate-link openings to conform the shape and orientation of contacting areas of the plate-link openings and of the rocker members with each other, wherein the tensile force applied to the chain is sufficient to plastically deform areas of contact of the plate links and of the rocker members.

5. A method in accordance with claim 4, wherein the tensile force applied to the chain is generated by applying a torque to at least one of the pairs of conical disks.

6. A method in accordance with claim 4, wherein individual disks of the pairs of conical disks are movable relative to each other along their respective axes of rotation, and wherein the tensile force applied to the chain is provided by moving at least one disk of each pair of conical disks toward an opposing disk in the directions of their axes of rotation.

7. A method in accordance with claim 4, wherein the tensile force applied to the chain causes bending of the rocker elements and the formation of a bend angle, relative to a transverse axis of the chain, and the opposed plate-link opening surface contacted by the rocker member is plastically deformed to conform substantially with the rocker element bend angle.

8. A method in accordance with claim 4, wherein plate links adjacent to an outer side edge of the chain are more highly plastically deformed than are plate links that are inward of the chain outer side edge.

9. A method in accordance with claim 4, wherein laterally adjacent plate link opening surfaces that are contacted by the same rocker member lie on a curve having the shape of an $n^{th}$ degree polynomial.

* * * * *